United States Patent
Hatanaka et al.

(10) Patent No.: US 12,081,962 B2
(45) Date of Patent: Sep. 3, 2024

(54) INFORMATION PROCESSING APPARATUS AND METHOD, AND PROGRAM

(71) Applicant: Sony Corporation, Tokyo (JP)

(72) Inventors: Mitsuyuki Hatanaka, Kanagawa (JP); Toru Chinen, Kanagawa (JP); Minoru Tsuji, Chiba (JP); Yuki Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 915 days.

(21) Appl. No.: 17/045,450

(22) PCT Filed: Mar. 29, 2019

(86) PCT No.: PCT/JP2019/013932
§ 371 (c)(1),
(2) Date: Oct. 5, 2020

(87) PCT Pub. No.: WO2019/198540
PCT Pub. Date: Oct. 17, 2019

(65) Prior Publication Data
US 2021/0176582 A1    Jun. 10, 2021

(30) Foreign Application Priority Data

Apr. 12, 2018 (JP) ................... 2018-076746

(51) Int. Cl.
*H04L 67/10* (2022.01)
*G10L 19/008* (2013.01)
(Continued)

(52) U.S. Cl.
CPC .............. *H04S 7/303* (2013.01); *H04L 67/10* (2013.01); *G10L 19/008* (2013.01); *G10L 25/51* (2013.01);
(Continued)

(58) Field of Classification Search
CPC .. H04S 7/303; H04S 2400/11; H04S 2420/11; H04L 67/10; H04N 21/234318;
(Continued)

(56) References Cited

U.S. PATENT DOCUMENTS

2008/0166991 A1   7/2008   Izumikawa
2015/0371645 A1   12/2015  Seo
(Continued)

FOREIGN PATENT DOCUMENTS

CN       102737635 A       10/2012
CN       103226385 A        7/2013
(Continued)

OTHER PUBLICATIONS

Cheng et al. ("A General Compression Approach to Multi-Channel Three-Dimensional Audio," in IEEE Transactions on Audio, Speech, and Language Processing, vol. 21, No. 8, pp. 1676-1688, Aug. 2013, doi: 10.1109/TASL.2013.2260156.) (Year: 2013).*
(Continued)

*Primary Examiner* — Manish S Shah
*Assistant Examiner* — Christian T Bryant
(74) *Attorney, Agent, or Firm* — Wolf, Greenfield & Sacks, P.C.

(57) ABSTRACT

The present technology relates to an information processing apparatus, an information processing method, and a program for achieving reduction of a processing load on a distribution side along with reduction of a transfer volume of information.
The information processing apparatus includes an acquisition unit that acquires low accuracy position information having first accuracy and indicating a position of an object within a space where a user is located and acquires additional information for obtaining position information that has second accuracy higher than the first accuracy, indicates (Continued)

the position of the object within the space, and corresponds to a position of the user and a position information calculation unit that obtains the position information on the basis of the low accuracy position information and the additional information. The present technology is applicable to an information processing apparatus.

8 Claims, 16 Drawing Sheets

(51) Int. Cl.
    *G10L 25/51*     (2013.01)
    *H04S 7/00*     (2006.01)
    *H04N 21/2343*     (2011.01)
    *H04N 21/44*     (2011.01)
    *H04N 21/81*     (2011.01)

(52) U.S. Cl.
CPC ............... *H04N 21/234318* (2013.01); *H04N 21/44012* (2013.01); *H04N 21/8106* (2013.01); *H04S 2400/11* (2013.01); *H04S 2420/11* (2013.01)

(58) Field of Classification Search
CPC .......... H04N 21/44012; H04N 21/8106; G10L 19/008; G10L 25/51
See application file for complete search history.

(56) References Cited

U.S. PATENT DOCUMENTS

| | | | |
|---|---|---|---|
| 2016/0133261 A1 | 5/2016 | Shi et al. | |
| 2017/0243403 A1* | 8/2017 | Daniels | G06F 3/1454 |
| 2017/0366912 A1 | 12/2017 | Stein | |
| 2017/0366913 A1 | 12/2017 | Stein | |
| 2018/0025045 A1 | 1/2018 | Kirti | |
| 2018/0091918 A1 | 3/2018 | Lee | |
| 2018/0098173 A1 | 4/2018 | Van Brandenburg et al. | |
| 2019/0349703 A1* | 11/2019 | Zilberman | H04S 7/303 |
| 2020/0120438 A1* | 4/2020 | Kim | H04S 3/008 |

FOREIGN PATENT DOCUMENTS

| | | |
|---|---|---|
| CN | 103348322 A | 10/2013 |
| CN | 105247893 A | 1/2016 |
| EP | 3007168 A1 | 4/2016 |
| EP | 3301951 A1 | 4/2018 |
| EP | 3301952 B1 | 11/2020 |
| KR | 20140128567 A | 11/2014 |
| WO | WO 2014/192602 A1 | 12/2014 |
| WO | WO-2016208406 A1 | 12/2016 |
| WO | WO-2018029341 A1 | 2/2018 |

OTHER PUBLICATIONS

Yang et al. ("A 3D audio coding technique based on extracting the distance parameter," 2014 IEEE International Conference on Multimedia and Expo (ICME), Chengdu, China, 2014, pp. 1-6, doi: 10.1109/ICME.2014.6890232.) (Year: 2014).*

Herre et al. ("MPEG-H 3D Audio—The New Standard for Coding of Immersive Spatial Audio," in IEEE Journal of Selected Topics in Signal Processing, vol. 9, No. 5, pp. 770-779, Aug. 2015, doi: 10.1109/JSTSP.2015.2411578.) (Year: 2015).*

Locke ("Cell Tower Triangulation—How it Works", The Wrongful Convictions Blog, Jun. 1, 2012, https://wrongfulconvictionsblog.org/2012/06/01/cell-tower-triangulation-how-it-works/) (Year: 2012).*

International Search Report and English translation thereof mailed May 21, 2019 in connection with International Application No. PCT/JP2019/013932.

[No Author Listed], International Standard ISO/IEC 23008-3. Information technology—High efficiency coding and media delivery in heterogeneous environments—Part 3: 3D audio. Feb. 1, 2016. 439 pages.

International Written Opinion and English translation thereof mailed May 21, 2019 in connection with International Application No. PCT/JP2019/013932.

International Preliminary Report on Patentability and English translation thereof mailed Oct. 22, 2020 in connection with International Application No. PCT/JP2019/013932.

* cited by examiner

FIG. 8

```
scene_description_header () {
    absoluteDistance;           32bit
    exp_index_high;             5bit
    Num_of_Object;              7bit
}
xyz_obj_pos(nobjs) {
    for(i=0;i<nobjs;i++) {
        sign_x(i) :             1bit
        sign_y(i) :             1bit
        sign_z(i) :             1bit
        Qpx_high(i): ceil(log2(absoluteDistance/step_high+1))bit
        Qpy_high(i): ceil(log2(absoluteDistance/step_high+1))bit
        Qpz_high(i): ceil(log2(absoluteDistance/step_high+1))bit
    }
}
```

FIG. 10

```
scene_description_header () {
    absoluteDistance;              32bit
    Num_of_Object;                 7bit
}
```

FIG. 11

```
xyz_obj_pos_low_precision(nobjs) {
 for(i = 0; i < nobjs; i++) {
  sign_x(i);           1bit
  sign_y(i);           1bit
  sign_z(i);           1bit
  Opx_low(i); ceil(log2(absoluteDistance/step_low +1))bit
  Opy_low(i); ceil(log2(absoluteDistance/step_low +1))bit
  Opz_low(i); ceil(log2(absoluteDistance/step_low +1))bit
 }
} step_low=2*tan(θ/2)*absoluteDistance/sqrt(3)
```

FIG. 12

| TOLERANCE ANGLE [DEGREES] | 0.75 |
|---|---|
| absoluteDistance [m] | 30 |
| Position VALUE TO BE ENCODED | 0.1 |

| EXPONENT OF 1/2 | DISTANCE BETWEEN LISTENER AND OBJECT [m] | QUANTIZED STEP WIDTH [m] | REAL NUMBER QUANTIZED VALUE | QUANTIZED BIT NUMBER | BINARY | INTEGER QUANTIZED VALUE | Position AFTER DECODING |
|---|---|---|---|---|---|---|---|
| 0 | 30 | 0.453475742 | | | | | |
| 1 | 15 | 0.226737871 | | | | | |
| 2 | 7.5 | 0.113368935 | | | | | |
| 3 | 3.75 | 0.056684468 | | | | | |
| 4 | 1.875 | 0.028342234 | | | | | |
| 5 | 0.9375 | 0.014171117 | | | | | |
| 6 | 0.46875 | 0.007085558 | | | | | |
| 7 | 0.234375 | 0.003542779 | 7.115568866 | 7 | 110 | 6 | 0.090695148 |
| 8 | 0.1171875 | 0.00177139 | 13.73113773 | 8 | 1101 | 13 | 0.098253077 |
| 9 | 0.05859375 | 0.000885695 | 26.96227546 | 9 | 11010 | 26 | 0.098253077 |
| | | | 53.42455093 | 10 | 110100 | 52 | 0.098253077 |
| | | | 106.3491019 | 11 | 1101001 | 105 | 0.099197819 |
| | | | 212.1982037 | 12 | 11010011 | 211 | 0.099670189 |
| | | | 423.8964074 | 13 | 110100111 | 423 | 0.099906374 |
| | | | 847.2928148 | 14 | 1101001110 | 846 | 0.099906374 |
| | | | 1694.08563 | 15 | 11010011101 | 1693 | 0.099965421 |
| | | | 3387.671259 | 16 | 110100111011 | 3387 | 0.099994944 |

FIG. 14

```
ResendRequest() {
  num_of_resend_objects:                              7bit
  for (j = 0; j < num_of_resend_objects; j++) {
    resend_object_index(j);                           7bit
    resend_exp_index(j);                              5bit
  }
}
```

FIG. 15

```
xyz_obj_pos_diff_precision(absoluteDistance, exp_index_resend(), nobjs) {
    for(j = 0; j < nobjs; j++) {
        Opx_diff(j):      resend_exp_index(j)bit
        Opy_diff(j):      resend_exp_index(j)bit
        Opz_diff(j):      resend_exp_index(j)bit
    }
}
```

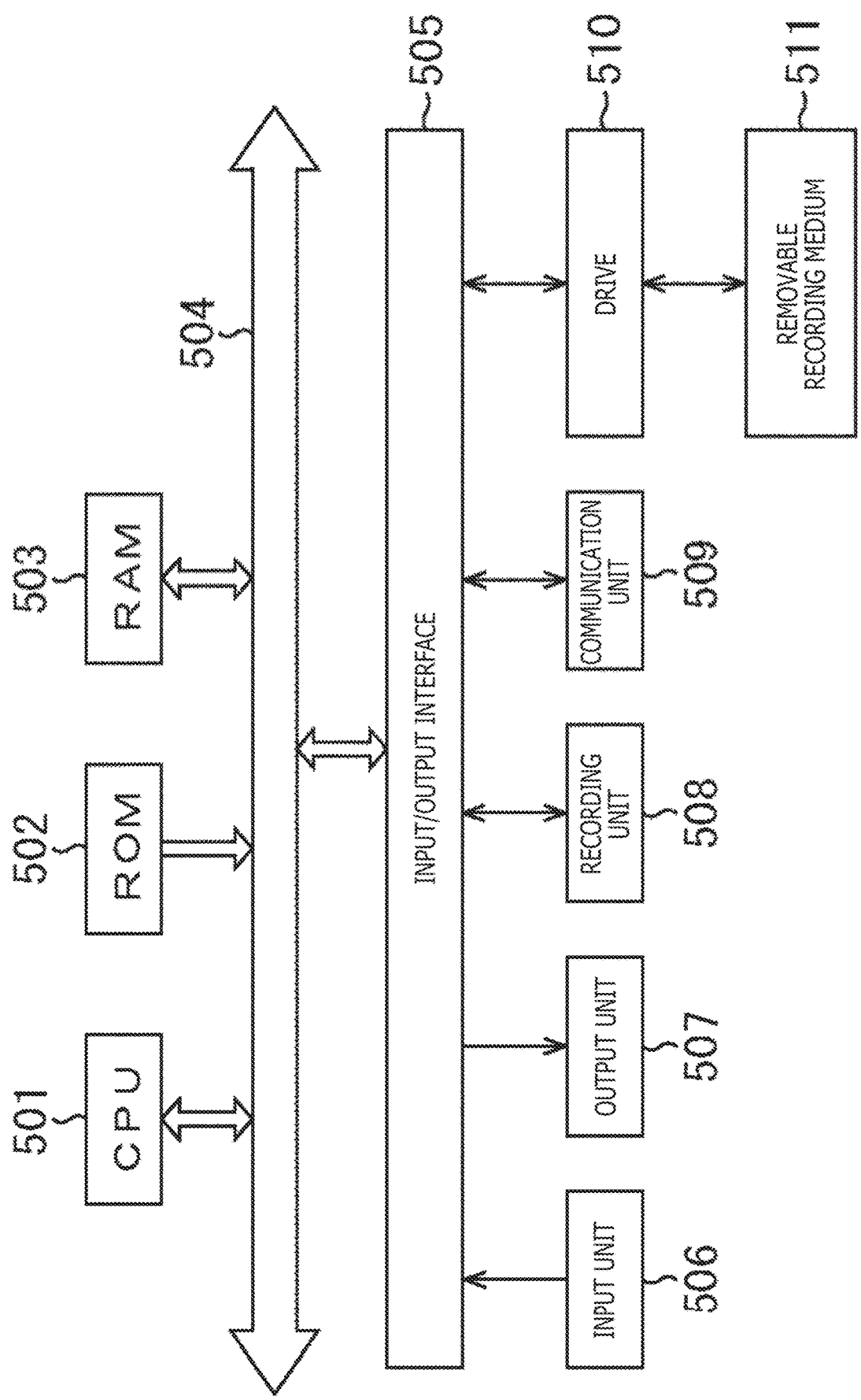

INFORMATION PROCESSING APPARATUS AND METHOD, AND PROGRAM

CROSS-REFERENCE TO RELATED APPLICATIONS

This application claims the benefit under 35 U.S.C. § 371 as a U.S. National Stage Entry of International Application No. PCT/JP2019/013932, filed in the Japanese Patent Office as a Receiving Office on Mar. 29, 2019, which claims priority to Japanese Patent Application Number JP 2018-076746, filed in the Japanese Patent Office on Apr. 12, 2018, each of which is hereby incorporated by reference in its entirety.

TECHNICAL FIELD

The present technology relates to an information processing apparatus, an information processing method, and a program and particularly to an information processing apparatus, an information processing method, and a program capable of reducing a processing load on a distribution side while reducing a transfer volume of information.

BACKGROUND ART

MPEG (Moving Picture Experts Group)-H encoding standards, which are standardized as conventional 3D Audio for fixed viewpoint, are established on the basis of an idea that an audio object moves within a space around an origin corresponding to a position of a listener (for example, see NPL 1).

Accordingly, at a fixed viewpoint, position information associated with respective audio objects as viewed from the listener located at the origin is described using polar coordinates based on angles in a horizontal direction, angles in a height direction, and distances from the listener to the respective audio objects.

By using the MPEG-H encoding standards described above, audio images of the audio objects can be localized at respective positions of the audio objects within the space in fixed viewpoint content. In this manner, high-presence audio reproduction is achievable.

CITATION LIST

Non Patent Literature

[NPL 1]
ISO/IEC 23008-3 Information technology—High efficiency coding and media delivery in heterogeneous environments—Part 3: 3D audio

SUMMARY

Technical Problems

Meanwhile, free viewpoint content is also known as content where a listener position is allowed to be located at any position within a space. At the free viewpoint, not only audio objects but also a listener can move within the space. In other words, the free viewpoint is different from the fixed viewpoint in that the listener is movable.

At the free viewpoint defined as above, audio reproduction is achievable similarly to the case of the fixed viewpoint by using a renderer having a polar coordinate system standardized under MPEG-H as long as position information associated with polar coordinates indicating positions of the audio objects as viewed from the listener is available. In other words, free viewpoint audio reproduction is achievable by a rendering process similar to that of the fixed viewpoint.

In this case, for example, audio data of the respective audio objects and position information indicating the positions of the audio objects are provided from a server to the reproduction side. Thereafter, rendering is performed on the reproduction side to achieve audio reproduction which localizes audio images at the positions of the audio objects within the space.

However, for achieving free viewpoint audio reproduction by using a renderer under MPEG-H, update of the positions of the audio objects as viewed from the listener and transfer of information associated with the positions of the audio objects are required every time the positions of the audio objects and the listener are changed. Accordingly, a transfer volume of information and a processing load on the content distribution side such as a server may increase. Moreover, in a case where the number of listeners connecting to the server increases, the processing load becomes heavier by a multiple of the increased number of the listeners. When the number of listeners becomes several thousands or several tens of thousands, the load may become excessive.

The present technology has been developed in consideration the aforementioned circumstances and achieves reduction of a processing load on a distribution side along with reduction of a transfer volume of information.

Solution to Problems

An information processing apparatus according to a first aspect of the present technology includes an acquisition unit that acquires low accuracy position information having first accuracy and indicating a position of an object within a space where a user is located and acquires additional information for obtaining position information that has second accuracy higher than the first accuracy, indicates the position of the object within the space, and corresponds to a position of the user and a position information calculation unit that obtains the position information on the basis of the low accuracy position information and the additional information.

An information processing method or a program according to the first aspect of the present technology includes steps of acquiring low accuracy position information that has first accuracy and indicates a position of an object within a space where a user is located, acquiring additional information for obtaining position information that has second accuracy higher than the first accuracy, indicates the position of the object within the space, and corresponds to a position of the user, and obtaining the position information on the basis of the low accuracy position information and the additional information.

According to the first aspect of the present technology, the low accuracy position information that has the first accuracy and indicates the position of the object within the space where the user is located is acquired. The additional information for obtaining position information that has the second accuracy higher than the first accuracy, indicates the position of the object within the space, and corresponds to the position of the user is acquired. The position information is obtained on the basis of the low accuracy position information and the additional information.

An information processing apparatus according to a second aspect of the present technology includes a communication unit that transmits low accuracy position information having first accuracy and indicating a position of an object within a space where a user is located and transmits additional information for obtaining position information having second accuracy higher than the first accuracy, indicating the position of the object within the space, and corresponding to a position of the user, in response to a request from a transmission destination of the low accuracy position information.

An information processing method or a program according to the second aspect of the present technology includes steps of transmitting low accuracy position information that has first accuracy and indicates a position of an object within a space where a user is located and transmitting additional information for obtaining position information that has second accuracy higher than the first accuracy, indicates the position of the object within the space, and corresponds to a position of the user, in response to a request from a transmission destination of the low accuracy position information.

According to the second aspect of the present technology, the low accuracy position information that has the first accuracy and indicates the position of the object within the space where the user is located is transmitted. The additional information for obtaining the position information that has the second accuracy higher than the first accuracy, indicates the position of the object within the space, and corresponds to the position of the user is transmitted in response to the request from the transmission destination of the low accuracy position information.

Advantageous Effects of Invention

According to the first and second aspects of the present technology, reduction of a processing load is achievable along with reduction of a transfer volume of information.

Note that advantageous effects to be produced are not limited to the advantageous effects described here and may be any advantageous effects described in the present disclosure.

BRIEF DESCRIPTION OF DRAWINGS

FIG. 8 is a diagram presenting a syntax example of a highest accuracy position encoded data file.

FIG. 10 is a diagram presenting a syntax example of header information.

FIG. 11 is a diagram presenting a syntax example of a bit stream containing low accuracy quantized position information.

FIG. 12 is a diagram explaining an encoding example of normalized position information.

FIG. 14 is a diagram presenting a syntax example of a transmission request of additional bit information.

FIG. 15 is a diagram presenting a syntax example of difference data.

FIG. 16 is a diagram depicting a configuration example of a computer.

DESCRIPTION OF EMBODIMENT

An embodiment to which the present technology is applied will hereinafter be described with reference to the drawings.

First Embodiment

<Configuration Example of Content Reproduction System>

The present technology switches levels of quantized accuracy of position information indicating a position of an object according to a distance between a listener and the object, to reduce a processing load on a content distribution side such as a server while reducing a transfer volume of information.

Note that described below is an example of a case where rendering of audio data of an audio object is performed on the content reproduction side on the basis of information indicating a position of the audio object as viewed from a listener, more specifically, a case where free viewpoint audio reproduction is implemented by using a renderer under MPEG-H. However, the present technology is also applicable to a case where a content video containing an object as an object of imaging is reproduced on the basis of information indicating a position of the object as viewed from a listener, for example.

Note that, hereinafter, an audio object will simply be referred to as an object.

Figure 1:
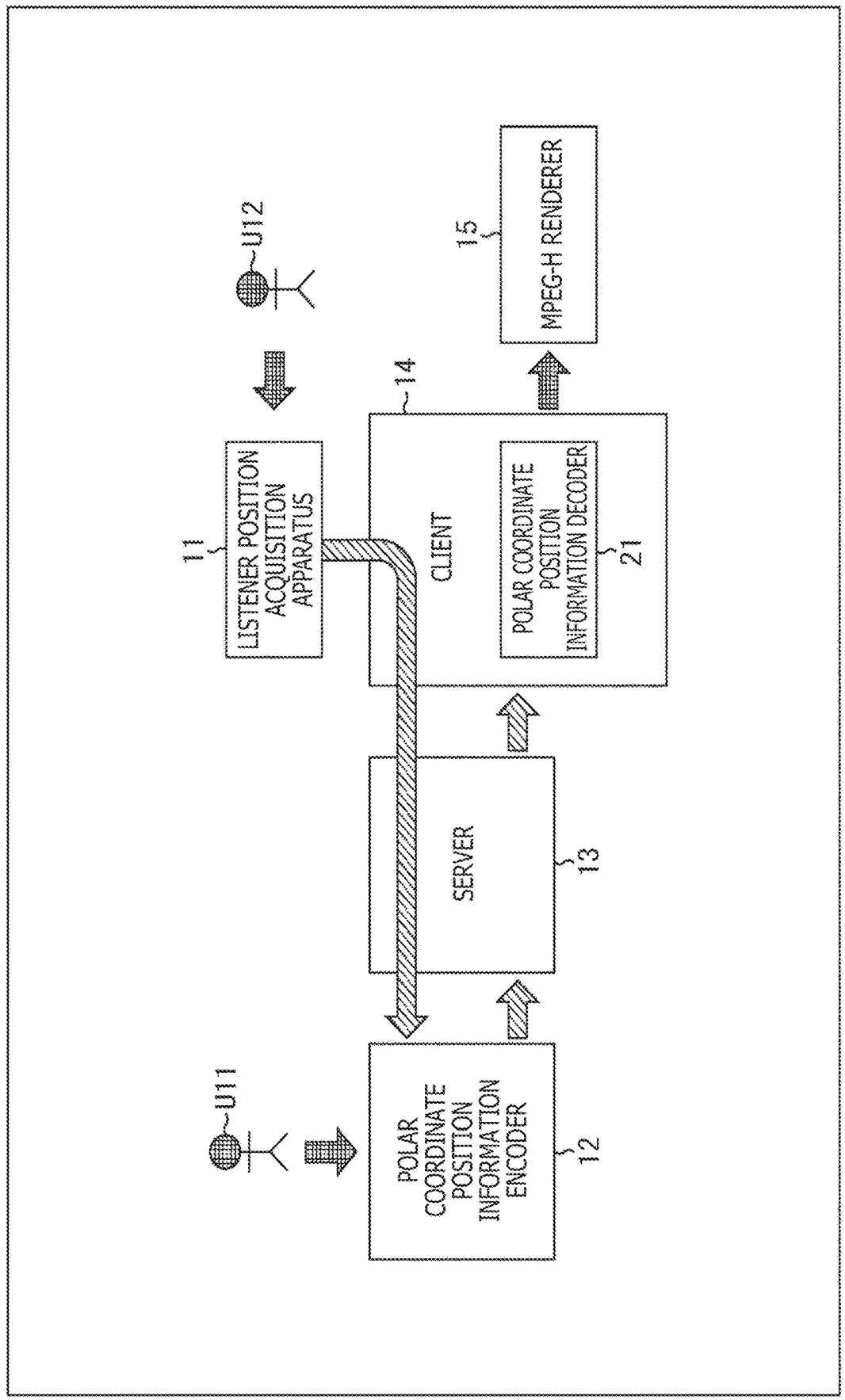
FIG. 1 is a diagram depicting a configuration example of a content reproduction system.

For example, in a case where free viewpoint audio reproduction is performed by using a renderer under MPEG-H, audio reproduction may be achieved by using a content reproduction system depicted in FIG. 1.

The content reproduction system depicted in FIG. 1 includes a listener position acquisition apparatus 11, a polar coordinate position information encoder 12, a server 13, a client 14, and an MPEG-H renderer 15.

According to this content reproduction system, a user U11 on the server side, such as a content creator, inputs object position information indicating positions of respective objects within a space to the polar coordinate position information encoder 12 for each of the objects in the space. Note that the object position information may indicate either absolute coordinates or polar coordinates.

In addition, a user who views and listens to reproduced content, i.e., a listener U12 listening to sound of the content, is located on the client 14 side. The listener position acquisition apparatus 11 acquires listener position information indicating a position of the listener U12 within the space.

For example, the listener position acquisition apparatus 11 includes a measuring device which measures the position of the listener U12 within the space, such as a GPS (Global Positioning System) and a gyro sensor, an input apparatus which acquires virtual position information associated with the listener U12 within a virtual space, or the like, and outputs listener position information indicating the position of the listener U12.

The listener position information here is absolute coordinate information indicating an absolute position of the listener U12 within the space and expressed by coordinates of a three-dimensional orthogonal coordinate system, i.e., an xyz coordinate system (x coordinate, y coordinate, and z coordinate). Information expressed by coordinates of the xyz coordinate system and indicating an absolute position within the space is hereinafter also referred to as absolute coordinates.

The listener position information output from the listener position acquisition apparatus 11 is received by the polar coordinate position information encoder 12 via the client 14 and the server 13.

The polar coordinate position information encoder 12 generates polar coordinates indicating the position of the object as viewed from the listener U12 within the space as polar coordinate position information, on the basis of the listener position information received from the listener position acquisition apparatus 11 and the object position information input from the user U11.

Thereafter, the polar coordinate position information encoder 12 encodes the polar coordinate position information obtained for each object and transmits the encoded polar coordinate position information to the client 14 via the server 13.

The client 14 receives the polar coordinate position information from the polar coordinate position information encoder 12, decodes the polar coordinate position information by using a polar coordinate position information decoder 21 provided on the client 14, and supplies the polar coordinate position information thus obtained to the MPEG-H renderer 15.

The MPEG-H renderer 15 receives supply of the polar coordinate position information for each object from the client 14 and also receives supply of audio data of each object from the server 13. The MPEG-H renderer 15 is a renderer which has a polar coordinate system standardized under MPEG-H.

The MPEG-H renderer 15 performs rendering on the basis of the audio data and the polar coordinate position information associated with the respective objects, generates reproduction audio data where audio images of the objects are localized at respective positions within the space, and outputs the generated reproduction audio data to a reproduction system such as a speaker.

Figure 2:
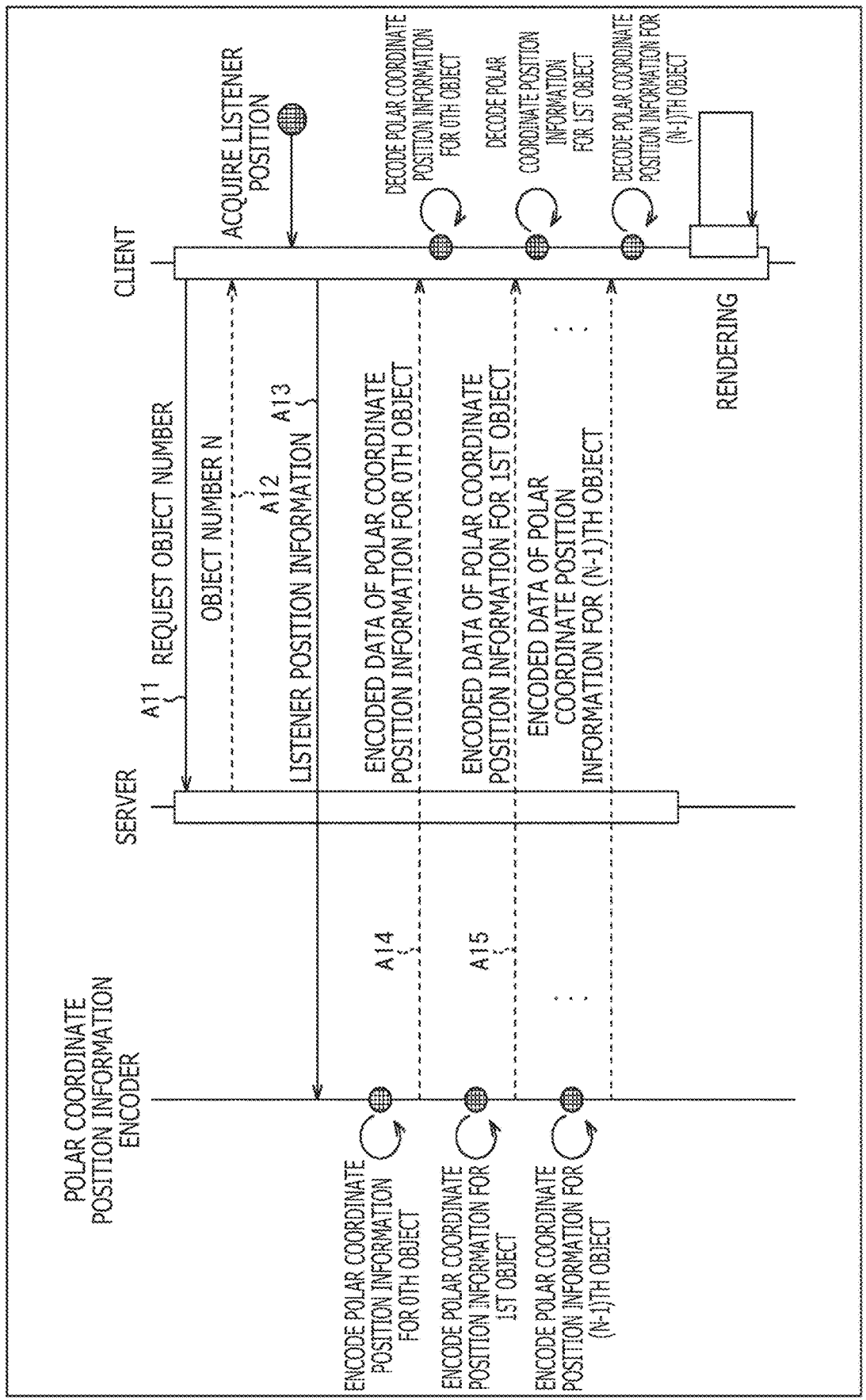
FIG. 2 is a diagram explaining a processing sequence of the content reproduction system.

In a case where N objects exist within the space, for example, a processing sequence presented in FIG. 2 is performed by the content reproduction system.

According to the example presented in FIG. 2, the client 14 first requests the server 13 to issue a notification regarding the number of objects present within the space, i.e., an object number, as indicated by an arrow A11.

In this case, the server 13 issues a notification regarding the object number to the client 14 in response to the request from the client 14 as indicated by an arrow A12.

Moreover, when the client 14 receives the listener position information from the listener position acquisition apparatus 11, the client 14 transmits the acquired listener position information to the polar coordinate position information encoder 12 via the server 13 as indicated by an arrow A13.

When the polar coordinate position information encoder 12 receives the listener position information, the polar coordinate position information encoder 12 calculates a position of a 0th object as viewed from the listener U12, on the basis of the listener position information and object position information associated with the 0th object, and encodes polar coordinate position information indicating a calculation result thus obtained. In other words, the polar coordinate position information is encoded into encoded data in a transferable format.

Thereafter, the polar coordinate position information encoder 12 transmits the encoded polar coordinate position information obtained for the 0th object, i.e., the encoded data of the polar coordinate position information, to the client 14 via the server 13 as indicated by an arrow A14.

On the client 14 side, the encoded data of the received polar coordinate position information associated with the 0th object is decoded by the polar coordinate position information decoder 21.

Similarly, the polar coordinate position information encoder 12 generates encoded data of polar coordinate position information obtained for a 1st object and transmits the encoded data of the polar coordinate position information associated with the 1st object to the client 14 via the server 13 as indicted by an arrow A15. In addition, on the client 14 side, the polar coordinate position information decoder 21 decodes the encoded data of the received polar coordinate position information associated with the 1st object.

Thereafter, generation and transmission of encoded data of polar coordinate position information, and decoding of encoded data of polar coordinate position information are sequentially performed for objects up to an (N−1)th object in following processing.

Polar coordinate position information is obtained for each of the N objects from the 0th object to the (N−1)th object by the above processing. Thereafter, rendering is performed by the MPEG-H renderer 15 on the basis of the polar coordinate position information and the object data associated with the respective objects.

By reproducing sound on the basis of reproduction audio data obtained by the rendering process, audio images of the objects can be localized at correct positions as viewed from the listener U12.

For reproducing free viewpoint content, for example, polar coordinate position information expressed by polar coordinates and indicating the positions of the objects as viewed from the listener U12 is needed as input to the MPEG-H renderer 15, to perform rendering using the MPEG-H renderer 15.

According to the content reproduction system depicted in FIG. 1, the MPEG-H renderer 15 for fixed viewpoint is also available for free viewpoint without any change. Moreover, generation and transmission of polar coordinate position information in real time by the polar coordinate position information encoder 12 produce such an advantageous effect that polar coordinate position information need not be retained by the server 13.

However, at the free viewpoint, not only the objects but also the listener U12 moves within the space. Accordingly, update and transfer of polar coordinate position information are required every time either any of the objects or the listener moves.

Particularly in the content reproduction system depicted in FIG. 1, update (encoding) of polar coordinate position information associated with all objects is performed in real time for all of the listeners U12 in a case where plural listeners U12 are present, i.e., in a case where plural clients 14 are connected to the server 13. In this case, a processing load of the polar coordinate position information encoder 12 on the content distribution side increases, and therefore, it becomes difficult to supply necessary polar coordinate position information associated with the objects to the client 14 by reproduction time, in some cases.

To solve this problem, it is possible to supply object position information indicating the positions of the objects expressed by absolute coordinates within the space to the client 14 from the server 13 and calculate polar coordinate position information on the client 14 side.

However, absolute coordinates are not originally dependent on the position of the listener U12. In this case, highly accurate expression is required, and therefore, transmission of the object position information to the client 14 is not desirable in view of a transfer volume. In other words, in the case of transfer of the object position information indicating absolute coordinates, the transfer volume of information (object position information) becomes larger than that volume in a case of transfer of polar coordinate position information indicating polar coordinates.

According to the present technology, therefore, information indicating low accuracy object positions and having a small information volume is temporarily transmitted to the client side, and then, information indicating a difference between the low accuracy information and high accuracy information is additionally transmitted as necessary to obtain sufficiently accurate information indicating the object positions. In this manner, not only reduction of a transfer volume of information but also reduction of a processing load on the content distribution side such as a polar coordinate position information encoder and a server is achievable.

Figure 3:
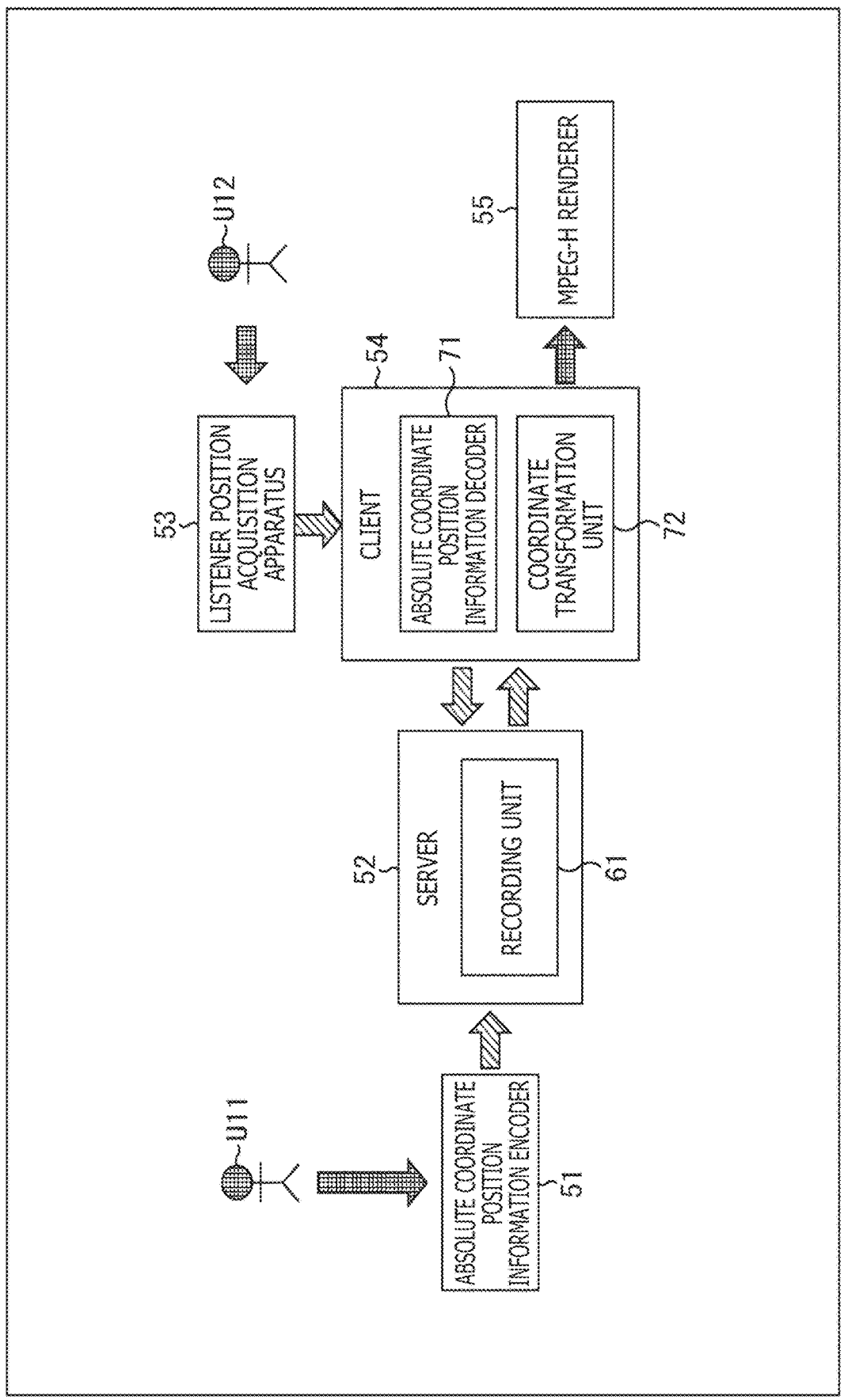
FIG. 3 is a diagram depicting a configuration example of the content reproduction system.

For example, the content reproduction system to which the present technology described above is applied is configured as depicted in FIG. 3. Note that parts in FIG. 3 identical to corresponding parts in FIG. 1 are given identical reference signs. Description of these parts is not repeated where appropriate.

The content reproduction system depicted in FIG. 3 includes an absolute coordinate position information encoder 51, a server 52, a listener position acquisition apparatus 53, a client 54, and an MPEG-H renderer 55. According to this content reproduction system, the client 54 calculates polar coordinate position information expressed by polar coordinates and indicating positions of objects as viewed from the listener U12.

More specifically, on the content distribution side, the user U11 inputs normalized position information indicating the positions of the respective objects within the space and others to the absolute coordinate position information encoder 51.

This normalized position information is normalized absolute coordinate information expressed by coordinates of a three-dimensional orthogonal coordinate system, i.e., an xyz coordinate system, and indicating absolute positions of the objects within the space.

The absolute coordinate position information encoder 51 encodes normalized position information and the like input from the user U11 and transmits a highest accuracy position encoded data file thus obtained to the server 52. Further, the server 52 is an information processing apparatus including a recording unit 61. The highest accuracy position encoded data file received from the absolute coordinate position information encoder 51 is recorded in the recording unit 61.

The highest accuracy position encoded data file here contains highest accuracy quantized position information obtained by quantizing normalized position information with highest accuracy for each of the objects, i.e., obtained by quantizing the normalized position information with a small quantized step width.

Quantized accuracy for obtaining highest accuracy quantized position information from normalized position information is hereinafter also referred to as highest accuracy, while a position indicated by the highest accuracy quantized position information is also referred to as a highest accuracy absolute position.

As described in detail below, quantized position information obtained by quantizing normalized position information with quantized accuracy lower than highest accuracy can be acquired by extracting a part of the highest accuracy quantized position information.

The quantized position information obtained by quantizing normalized position information with quantized accuracy lower than highest accuracy is hereinafter also referred to as low accuracy quantized position information. Low accuracy quantized position information with lowest quantized accuracy in the low accuracy quantized position information is also particularly referred to as lowest accuracy quantized position information. Moreover, a position indicated by the low accuracy quantized position information is hereinafter also referred to as a low accuracy absolute position, while a position indicated by the lowest accuracy quantized position information is also referred to as a lowest accuracy absolute position.

Furthermore, an absolute position of an object in a case of no necessity of particular distinction between a highest accuracy absolute position and a low accuracy absolute position is hereinafter also simply referred to as an absolute position of an object. Quantized position information associated with an object in a case of no particular necessity of distinction between highest accuracy quantized position information and low accuracy quantized position information is also simply referred to as quantized position information associated with an object.

The low accuracy quantized position information is absolute coordinate information indicating a position of an object with lower accuracy than that of highest accuracy quantized position information. The low accuracy quantized position information has a smaller volume of information, i.e., a smaller bit number, than that of the highest accuracy quantized position information, and thus achieves reduction of a transfer volume of information.

In addition, on the client 54 side, listener position information indicating the position of the listener U12 is acquired by the listener position acquisition apparatus 53 corresponding to the listener position acquisition apparatus 11 depicted in FIG. 1 and is supplied to the client 54. For example, the listener position acquisition apparatus 53 includes a measuring device such as a GPS and a gyro sensor, an input apparatus which acquires virtual position information associated with the listener U12 within a virtual space, and the like.

The client 54 is an information processing apparatus which includes an absolute coordinate position information decoder 71 and a coordinate transformation unit 72, and acquires lowest accuracy quantized position information from the server 52. Note that described below will be an example where the client 54 acquires lowest accuracy quantized position information from the server 52. However, low accuracy quantized position information with any level of quantized accuracy other than the lowest accuracy may be acquired as long as the quantized accuracy is lower than the highest accuracy.

The absolute coordinate position information decoder 71 decodes the lowest accuracy quantized position information acquired from the server 52 and determines whether a position of an object indicated by the lowest accuracy quantized position information has sufficient accuracy, on the basis of the listener position information.

At this time, the client 54 acquires additional bit information for obtaining quantized position information with sufficient accuracy from the server 52 for the object determined as not having sufficient accuracy. The additional bit information is difference information between quantized position information with sufficient accuracy and the lowest accuracy quantized position information. Quantized position information with sufficient accuracy can be obtained by adding the additional bit information to the lowest accuracy quantized position information. Note that the quantized position information with sufficient accuracy coincides with the highest accuracy quantized position information in some cases.

When quantized position information with sufficient accuracy is obtained for each of the objects, the coordinate transformation unit 72 transforms the respective pieces of the quantized position information into polar coordinates indicating relative positions of the respective objects within the space as viewed from the listener U12 and designates the polar coordinates as polar coordinate position information.

The coordinate transformation unit 72 supplies the polar coordinate position information associated with the respective objects to the MPEG-H renderer 55. The MPEG-H renderer 55 performs rendering on the basis of the supplied polar coordinate position information and audio data that is associated with the respective objects and is acquired from the server 52.

Thereafter, the MPEG-H renderer 55 outputs, to the reproduction system such as a speaker, reproduction audio data obtained by rendering, as data where audio images of the objects are localized at respective positions within the space, to allow the reproduction system to reproduce sound. Note that the MPEG-H renderer 55 is a renderer which has a polar coordinate system standardized by MPEG-H, similarly to the MPEG-H renderer 15 of FIG. 1.

According to the content reproduction system configured as described above, information indicating positions of objects and transmitted and received to and from the server 52 and the client 54 is lowest accuracy quantized position information indicating absolute coordinates. Accordingly, offered are such advantageous effects that the position of the listener U12 within the space need not be considered and that lowest accuracy quantized position information associated with only a moving object is required to be encoded and transferred to the client 54.

<Configuration Example of Server>

Described next will be a more detailed configuration example of the server 52 and the client 54 depicted in FIG. 3. The configuration example of the server 52 will first be described.

Figure 4:
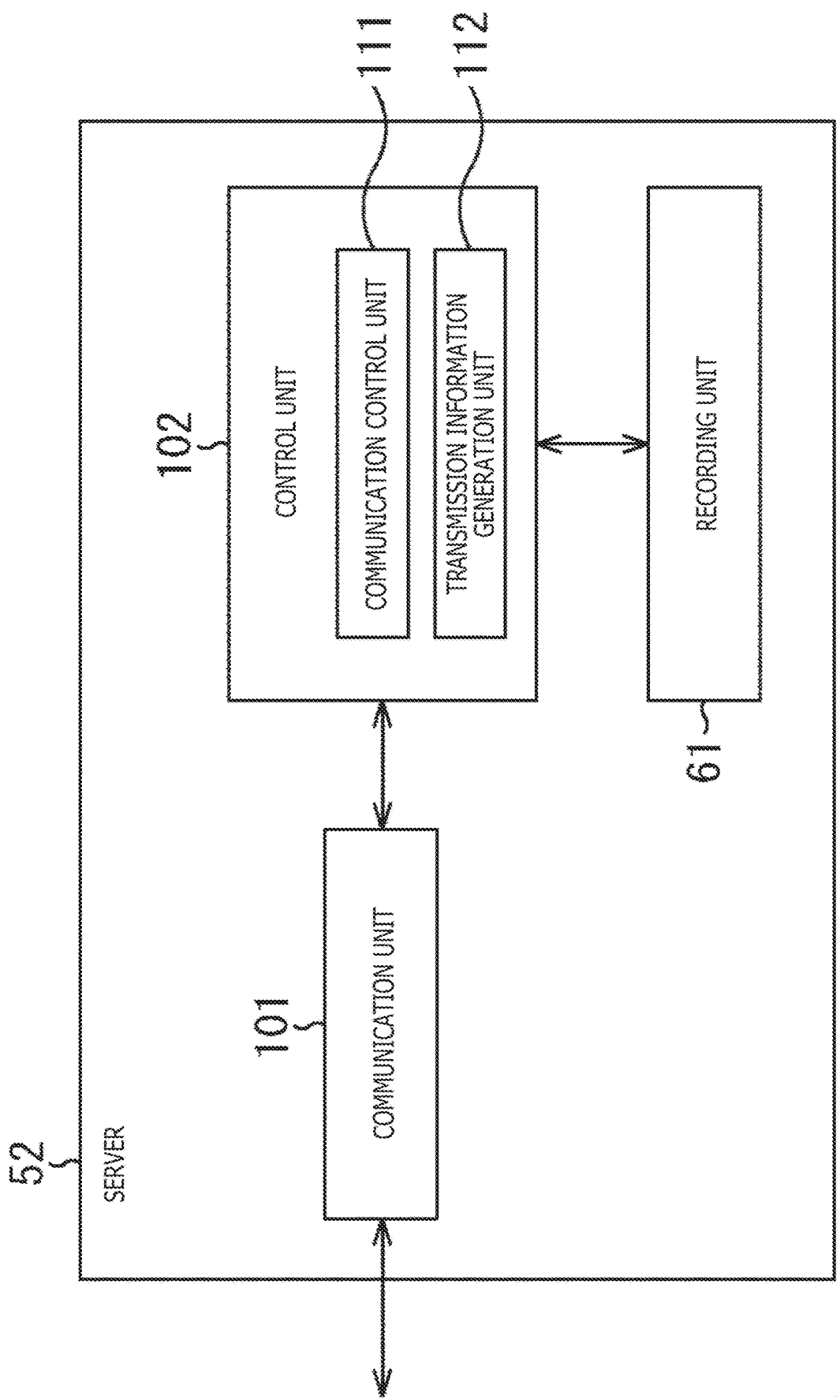
FIG. 4 is a diagram depicting a configuration example of a server.

For example, the server 52 is configured as depicted in FIG. 4. Note that parts in FIG. 4 identical to corresponding parts in FIG. 3 are given identical reference signs. Description of these parts is not repeated where appropriate.

The server 52 depicted in FIG. 4 includes a communication unit 101, the control unit 102, and the recording unit 61.

The communication unit 101 transmits various types of information supplied from the control unit 102 to the client 54 and also receives various types of information transmitted from the absolute coordinate position information encoder 51 and the client 54, to supply the received information to the control unit 102.

The control unit 102 controls overall operations of the server 52. The control unit 102 includes a communication control unit 111 and a transmission information generation unit 112.

The communication control unit 111 controls the communication unit 101 to control communication performed by the communication unit 101 with the absolute coordinate position information encoder 51 and the client 54. The transmission information generation unit 112 generates various types of information to be transmitted to the client 54, by using information recorded in the recording unit 61, such as the highest accuracy position encoded data file, as necessary.

<Configuration Example of Client>

Figure 5:
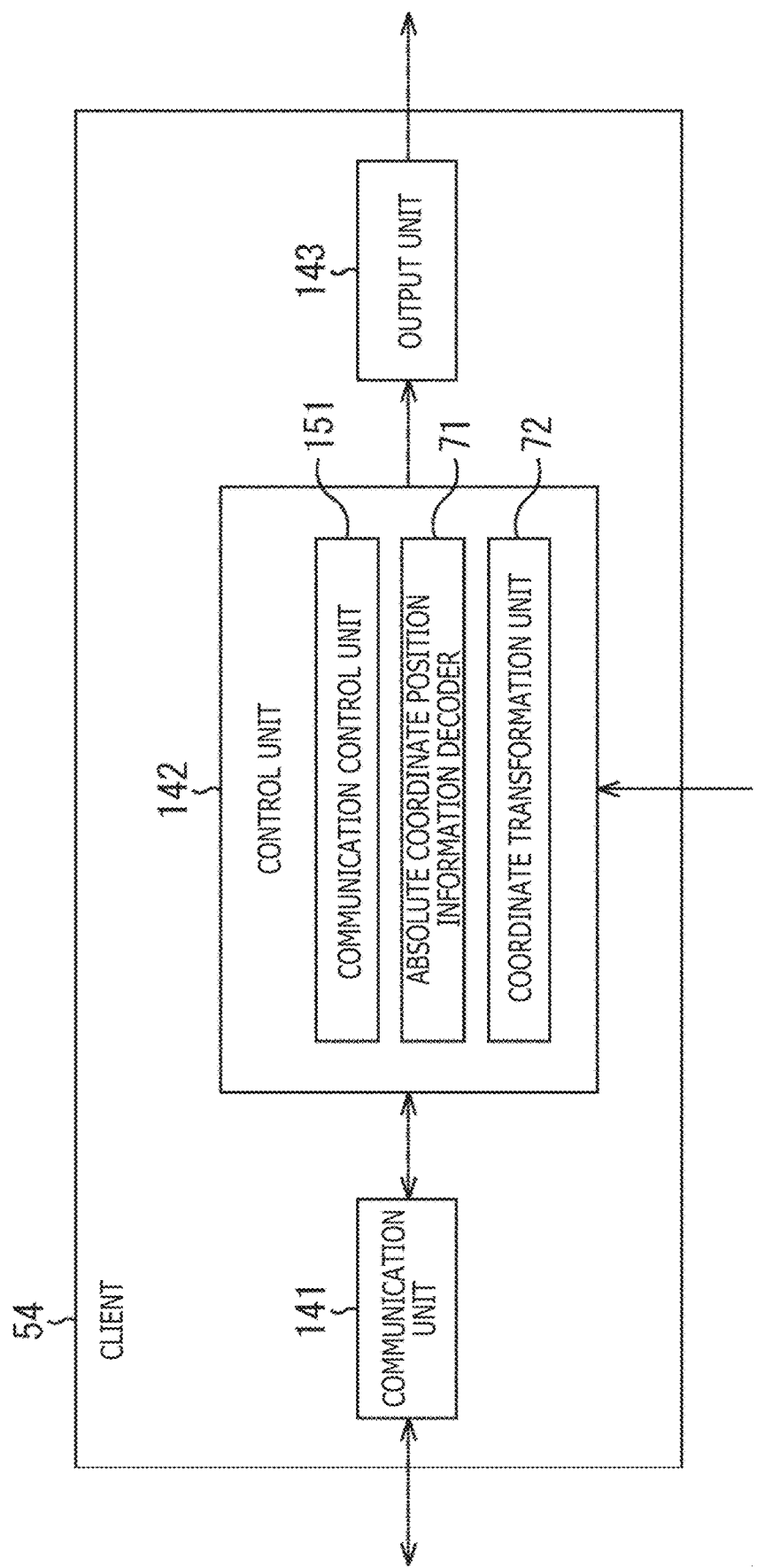
FIG. 5 is a diagram depicting a configuration example of a client.

In addition, for example, the client 54 is configured as depicted in FIG. 5. Note that parts in FIG. 5 identical to corresponding parts in FIG. 3 are given identical reference signs. Description of these parts is not repeated where appropriate.

The client 54 depicted in FIG. 5 includes a communication unit 141, a control unit 142, and an output unit 143.

The communication unit 141 transmits various types of information supplied from the control unit 142 to the server 52 and also receives various types of information transmitted from the server 52, to supply the received information to the control unit 142.

The control unit 142 controls overall operations of the client 54. The control unit 142 includes a communication control unit 151, the absolute coordinate position information decoder 71, and the coordinate transformation unit 72.

The communication control unit 151 controls the communication unit 141 to control communication performed by the communication unit 141 with the server 52. For example, the communication control unit 151 controls the communication unit 141 to function as an acquisition unit for acquiring lowest accuracy quantized position information and additional bit information from the server 52.

The absolute coordinate position information decoder 71 calculates information indicating absolute positions of objects on the basis of the lowest accuracy quantized position information and the additional bit information, to function as a position information calculation unit which decodes encoded normalized position information.

The output unit 143 outputs, to the MPEG-H renderer 55, polar coordinate position information associated with the respective objects and obtained by coordinate transformation performed by the coordinate transformation unit 72.

<Encoding of Normalized Position Information>

Described subsequently will be encoding (quantization) of normalized position information for each object.

Figure 6:
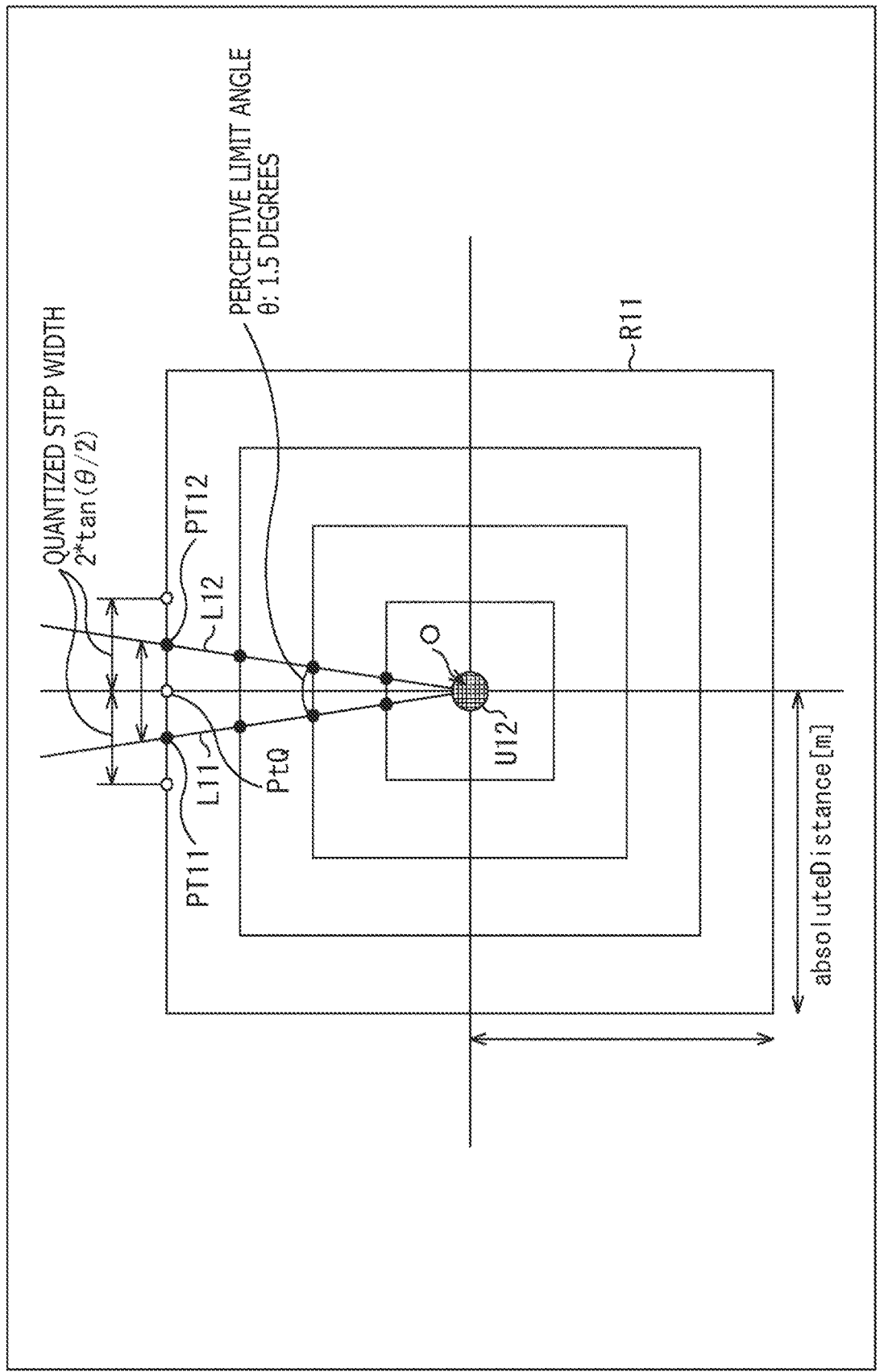
FIG. 6 is a diagram explaining a perceptive limit angle.

For example, suppose that a space corresponding to a content target, i.e., a space where the listener U12 corresponding to a user and an object are present, is a cubic space and that the listener U12 is located at a center position within the space at a certain time as depicted in FIG. 6. Note that parts in FIG. 6 identical to corresponding parts in FIG. 3 are given identical reference signs. Description of these parts is not repeated where appropriate.

FIG. 6 is a figure presenting a region R11 inside a quadrangular external shape in a three-dimensional space where the listener U12 and the object are present, as a view overlooked in a direction of a z-axis from a positive side to a negative side in an xyz coordinate system. A center position of the three-dimensional space corresponds to an origin O of the xyz coordinate system. In addition, the listener U12 is in a state located at the position of the origin O here.

It is further assumed that half the length of one side of a cube corresponding to the space expressed by the region R11, i.e., an actual length from the origin O to an end of the cube, is an absolute distance absoluteDistance. It is assumed here that the length of the absolute distance absoluteDistance is expressed in meters (m) or the like, for example, and that information indicating the absolute distance absoluteDistance is hereinafter also referred to as absolute distance information absoluteDistance.

According to human auditory sensation, it is known that an angle in a horizontal direction within a certain right and left range with respect to a front object is recognized as an angle identical to a front angle. This angle is called a perceptive limit angle θ. It is assumed here that the perceptive limit angle θ is an angle of 1.5 degrees.

Accordingly, assuming that the perceptive limit angle θ is an angle formed by a line L11 and a line L12, for example, the listener U12 positioned at the origin O perceives sounds of audio images located at any positions as if these sounds come from the same direction in a case where the audio images are localized at any positions between a point PT11 and a point PT12. Accordingly, in this case, a distance between the point PT11 and the point PT12 in normalized position information associated with an object located between the point PT11 and the point PT12 is quantized as a quantized step width, and a quantized representative value obtained at such time is designated as a value indicating a position PtQ. In this manner, a bit number of quantized position information can be reduced without giving a sense of disagreement of the audio image position.

In addition, a tolerance of the listener U12 in the horizontal direction with respect to a sound coming direction is the perceptive limit angle θ as angle information. Accordingly, an absolute width of the tolerance becomes larger in a case of a long distance between the listener U12 and the object than in a case of a short distance therebetween even within the same range of 0.75 degrees to the left and right for each in both cases.

According to the present technology, a transfer volume of information can be reduced without giving a sense of a perceptive difference from an original audio image direction by changing quantized accuracy of quantized position information, i.e., a quantized step width, according to a distance between the listener U12 and an object, by using the human perceptive limit angle θ.

More specifically, an object number nObj, the absolute distance information absoluteDistance, minimum distance information, normalized position information for each object, and the perceptive limit angle θ are input from the user U11 to the absolute coordinate position information encoder 51.

The object number nObj here is the number of objects present within a space. It is assumed below that a space corresponding to a content target has a cubic shape and that a center position of the cube corresponds to the origin O of the xyz coordinate system.

The minimum distance information is information indicating a minimum distance MinDist as an allowable minimum distance between the listener U12 and each of the objects.

For example, the minimum distance MinDist is expressed in meters (m) similarly to the absolute distance absoluteDistance. For example, the minimum distance MinDist described above is determined such that the listener U12 and each of the objects do not overlap each other, in consideration of a head size of the listener U12. Needless to say, an audio image of each of the objects may be localized at the position of the listener U12 by setting the minimum distance MinDist=0. It is assumed below that minimum distance information indicating the minimum distance MinDist is also referred to as minimum distance information MinDist.

Moreover, normalized position information associated with each of the objects is information which includes Px(i), Py(i), and Pz(i) corresponding to an x coordinate, y coordinate, and a z coordinate, respectively and indicating an absolute position of an object in the xyz coordinate system. In each of the coordinates, i (provided, 0≤i<nObj) is an index for identifying the object.

Further, for example, it is assumed that the perceptive limit angle θ is a predetermined angle, i.e., an angle of 1.5 degrees, and that the perceptive limit angle θ thus determined is also known on the client 54 side.

When the user U11 inputs respective items of information, the absolute coordinate position information encoder 51 encodes the respective input items of information as necessary to generate a highest accuracy position encoded data file as output encoded information. For example, the highest accuracy position encoded data file contains the object number nObj, the absolute distance information absoluteDistance, the highest accuracy quantized position information, and an exponent part index exp_index_high.

For example, each of the object number nObj and the absolute distance information absoluteDistance is a non-compressed value here. In addition, the highest accuracy quantized position information is information including Qpx_high(i), Qpy_high(i), and Qpz_high(i) corresponding to mantissa parts of respective coordinates of an x coordinate, a y coordinate, and a z coordinate indicating a highest accuracy absolute position in the xyz coordinate system, respectively and sign_x(i), sign_y(i), and sign_z(i) corresponding to sign bit information indicating a positive or negative sign of the respective coordinates.

Note that each of the mantissa parts of the highest accuracy absolute position and i (provided, 0≤i<nObj) in the sign bit information is an index for identifying an object. In addition, each sign bit information has a non-compressed value. The sign bit information having a value of 0 indicates that the coordinate has a positive value, while the sign bit information having a value of 1 indicates that the coordinate has a negative value.

The exponent part index exp_index_high is an index of a value of ½ raised to the power of an exponent, i.e., an index of an exponent part of ½ raised to the power of the exponent in a case of the minimum distance MinDist, i.e., in a case of highest quantized accuracy. For example, the exponent part index exp_index_high has a compressed value.

Specifically, the exponent part index exp_index_high at the minimum distance MinDist is obtained by calculating the following Equation (1) on the basis of the minimum distance MinDist.

[Math. 1]

$$\text{exp\_index\_high} = INT(\max(\{n | (½)^n < \text{MinDist}\})) \quad (1)$$

Note that INT( ) in Equation (1) indicates an INT function which outputs an integer part of an argument.

Moreover, mantissa parts Qpx_high(i), Qpy_high(i), and Qpz_high(i) of highest accuracy quantized position information of an ith object can be obtained by calculating the following Equation (2) on the basis of an x coordinate Px(i), a y coordinate Py(i), and a z coordinate Pz(i) of normalized position information, the exponent part index exp_index_high, and the perceptive limit angle θ.

[Math. 2]

$$Qpx\_high(i) = |Px(i) + (½)step\_high|/step\_high$$

$$Qpy\_high(i) = |Py(i) + (½)step\_high|/step\_high$$

$$Qpz\_high(i) = |Pz(i) + (½)step\_high|/step\_high \quad (2)$$

In Equation (2), step_high indicates a quantized step width corresponding to the exponent part index exp_index_high and is calculated by the following Equation (3). In Equation (3), sqrt( ) indicates a square root.

[Math. 3]

$$step\_high = 2 \times \tan(\theta/2) \times absoluteDistance/\mathrm{sqrt}(3) \times (½)^{exp\_index\_high} \quad (3)$$

Note that the value of the exponent part index exp_index_high is decreased in increments of one to obtain the value of the exponent part index exp_index of low accuracy quantized position information corresponding to each of quantized accuracy. Quantized accuracy lowers as the value of the exponent part index exp_index decreases. Accordingly, the value of the exponent part index exp_index of lowest accuracy quantized position information becomes 0.

An index of an exponent part of ½ raised to the power of the exponent with predetermined quantized accuracy including the exponent part index exp_index_high is hereinafter also simply referred to as an exponent part index exp_index, in a case where no particular distinction is needed between respective levels of quantized accuracy.

According to the present technology, as described above, the quantized step width with highest accuracy is a value of ½ raised to the power of an exponent, more specifically, a value obtained by multiplying a value of ½ raised to the power of an exponent by a constant 2 tan (θ/2)/sqrt(3) determined by the perceptive limit angle θ. The exponent of the value of ½ raised to the power of exponent at this time corresponds to the exponent part index exp_index_high. In this manner, a mantissa part of low accuracy quantized position information can easily be obtained only by extracting a part of a mantissa part of highest accuracy quantized position information.

In addition, the absolute coordinate position information encoder 51 encodes a sign bit of normalized position information in the following manner.

Specifically, the value of the sign bit information sign_x(i) of the x coordinate is set to 0 when the value of the x coordinate Px(i) is 0 or larger. The value of the sign bit information sign_x(i) of the x coordinate is set to 1 when the value of the x coordinate Px(i) is smaller than 0.

Similarly, the value of the sign bit information sign_y(i) of the y coordinate is set to 0 when the value of the y coordinate Py(i) is 0 or larger. The value of the sign bit information sign_y(i) of the y coordinate is set to 1 when the value of the y coordinate Py(i) is smaller than. Further, the value of the sign bit information sign_z(i) of the z coordinate is set to 0 when the value of the z coordinate Pz(i) is 0 or larger. The value of the sign bit information sign_z(i) of the z coordinate is set to 1 when the value of the z coordinate Pz(i) is smaller than 0.

On the other hand, decoding of highest accuracy quantized position information and low accuracy quantized position information is performed in the following manner on the client 54 side.

Specifically, during decoding, the following Equation (4) is calculated on the basis of the perceptive limit angle θ known beforehand, the absolute distance information absoluteDistance received from the server 52, and an exponent part index exp_index_sel finally decided, to obtain a quantized step width step_dec.

[Math. 4]

$$step\_dec = 2 \times \tan(\theta/2) \times absoluteDistance/\mathrm{sqrt}(3) \times (½)^{exp\_index\_sel} \quad (4)$$

The exponent part index exp_index_sel corresponds to the exponent part index exp_index.

If quantized position information to be decoded is highest accuracy quantized position information, for example, the value of the exponent part index exp_index_sel is set to the same value as the value of the exponent part index exp_index_high. In addition, if quantized position information to be decoded is lowest accuracy quantized position information, the value of the exponent part index exp_index_sel is set to 0.

Further, decoding of the sign bit information sign_x(i), sign_y(i), and sign_z(i) is also performed.

Specifically, if the value of the sign bit information sign_x(i) is 0, a value of sign bit information sign_x_val(i) indicating the sign of the x coordinate of normalized position information obtained by decoding is set to 1. If the value of the sign bit information sign_x(i) is 1, the value of the sign bit information sign_x_val(i) indicating the sign of the x coordinate of the normalized position information obtained by decoding is set to −1.

Similarly, if the value of the sign bit information sign_y(i) is 0, a value of sign bit information sign_y_val(i) indicating the sign of the y coordinate of normalized position information obtained by decoding is set to 1. If the value of the sign bit information sign_y(i) is 1, the value of the sign bit information sign_y_val(i) indicating the sign of the y coordinate of the normalized position information obtained by decoding is set to −1.

If the value of the sign bit information sign_z(i) is 0, a value of sign bit information sign_z_val(i) indicating the sign of the z coordinate of normalized position information obtained by decoding is set to 1. If the value of the sign bit information sign_z(i) is 1, the value of the sign bit information sign_z_val(i) indicating the sign of the z coordinate of the normalized position information obtained by decoding is set to −1.

When the quantized step width step_dec and the sign bit information sign_x_val(i), sign_y_val(i), and sign_z_val(i) subjected to decoding are obtained, the following Equation (5) is calculated on the basis of these items of information, the absolute distance information absoluteDistance received from the server 52, and the mantissa parts of the quantized position information finally decided, to obtain final decoded normalized position information. The decoded normalized position information is absolute coordinate information obtained by decoding encoded normalized position information.

[Math. 5]

$$Dpx(i) = \mathrm{sign}\_x\_val(i) \times Qpx\_sel(i) \times step\_dec/absoluteDistance$$

$$Dpy(i) = \mathrm{sign}\_y\_val(i) \times Qpy\_sel(i) \times step\_dec/absoluteDistance$$

$$Dpz(i) = \mathrm{sign}\_z\_val(i) \times Qpz\_sel(i) \times step\_dec/absoluteDistance \quad (5)$$

Note that Dpx(i), Dpy(i), and Dpz(i) in Equation (5) are an x coordinate, a y coordinate, and a z coordinate obtained by decoding an x coordinate Px(i), a y coordinate Py(i), and a z coordinate Pz(i) of normalized position information associated with an encoded ith object. Moreover, position information including the x coordinate Dpx(i), the y coordinate Dpy(i), and the z coordinate Dpz(i) is designated as decoded normalized position information indicating an absolute position of the object in the xyz coordinate system and obtained by decoding.

Furthermore, Qpx_sel(i), Qpy_sel(i), and Qpz_sel(i) in Equation (5) are mantissa parts of the x coordinate, the y coordinate, and the z coordinate of the quantized position information associated with the ith object and finally decided. For example, in a case where the quantized position information associated with the object and finally decided is highest accuracy quantized position information, the mantissa parts Qpx_sel(i), Qpy_sel(i), and Qpz_sel(i) become the mantissa parts Qpx_high(i), Qpy_high(i), and Qpz_high(i), respectively.

<Description of Encoding Process and File Storing Process>

Described next will be a specific process performed by the content reproduction system.

Figure 7:
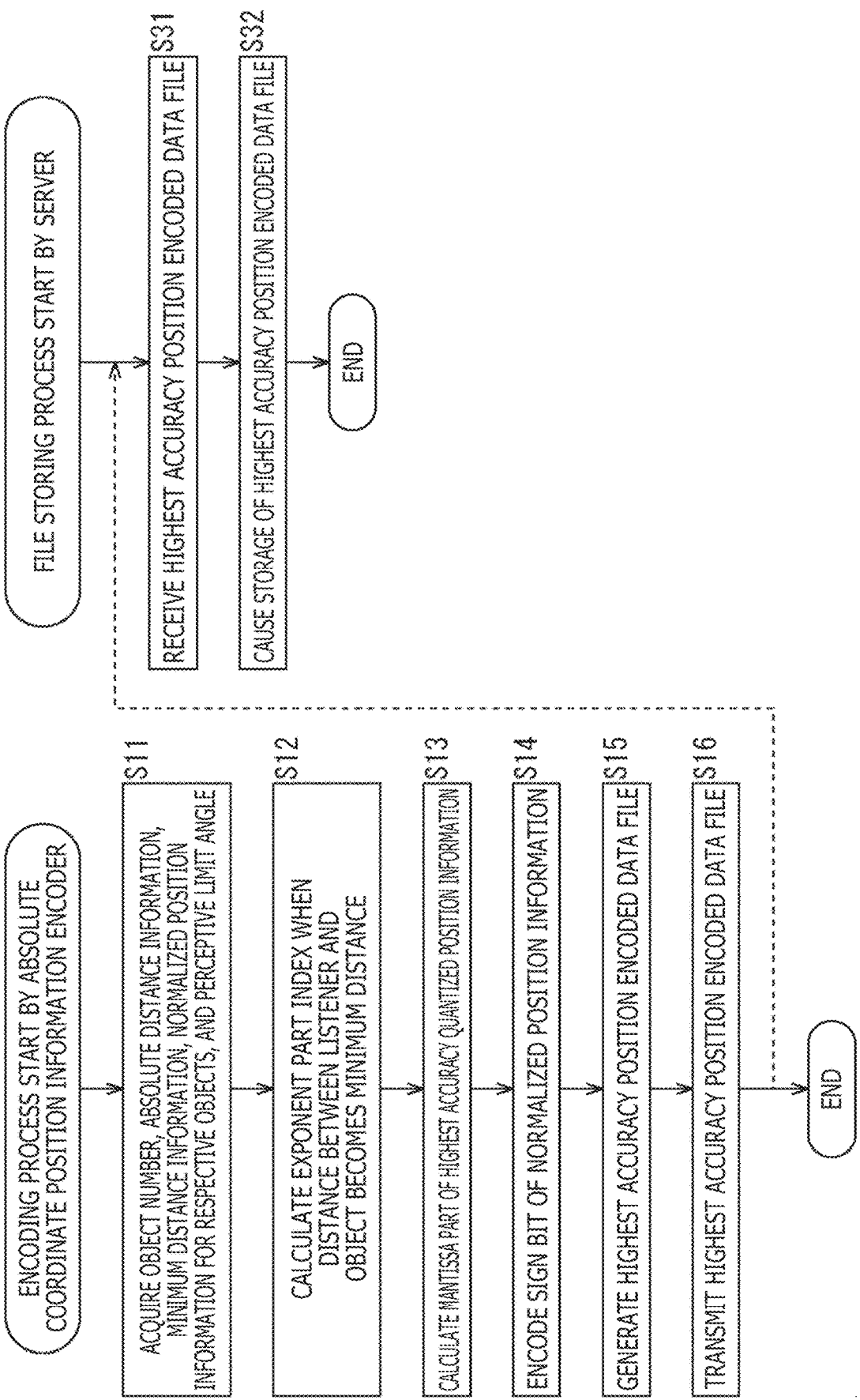
FIG. 7 is a flowchart explaining an encoding process and a file storing process.

An encoding process performed by the absolute coordinate position information encoder 51 and a file storing process performed by the server 52 will first be described with reference to a flowchart of FIG. 7.

With a start of the encoding process, the absolute coordinate position information encoder 51 in step S11 acquires an object number nObj, absolute distance information absoluteDistance, minimum distance information MinDist, normalized position information for each object, and a perceptive limit angle θ, each input from the user U11.

In step S12, the absolute coordinate position information encoder 51 calculates Equation (1) to calculate an exponent part index exp_index_high when a distance between the listener U12 and an object becomes the minimum distance MinDist.

In step S13, the absolute coordinate position information encoder 51 calculates Equation (2) for each object on the basis of normalized position information, an exponent part index exp_index_high, the absolute distance information absoluteDistance, and the perceptive limit angle θ, to calculate mantissa parts Qpx_high(i), Qpy_high(i), and Qpz_high(i) of highest accuracy quantized position information.

In step S14, the absolute coordinate position information encoder 51 encodes sign bits of normalized position information for each object to obtain sign bit information sign_x(i), sign_y(i), and sign_z(i).

The normalized position information associated with each object is encoded (quantized) with highest accuracy by obtaining the mantissa parts and the sign bit information corresponding to the highest accuracy quantized position information by the above-described processing.

In step S15, the absolute coordinate position information encoder 51 generates a highest accuracy position encoded data file containing highest accuracy quantized position information for each object.

In this manner, a highest accuracy position encoded data file in a format depicted in FIG. 8 is generated, for example. Specifically, FIG. 8 is a diagram presenting an example of syntax of the highest accuracy position encoded data file.

In this example, the absolute distance information absoluteDistance is disposed at the head of the highest accuracy position encoded data file, and the exponent part index exp_index_high is disposed after the absolute distance information absoluteDistance. Moreover, information indicating the object number nObj expressed by a character "Num_of_Object" is disposed subsequently to the exponent part index exp_index_high.

Further, the number of sign bit information sign_x(i), sign_y(i), and sign_z(i) and mantissa parts Qpx_high(i), Qpy_high(i), and Qpz_high(i) of the highest accuracy quantized position information indicated by the object number nObj are disposed for each object after the information indicating the object number nObj.

Note that ceil( ) indicating the bit number of the mantissa part of the highest accuracy quantized position information in the example of FIG. 8 represents a ceiling function which outputs a minimum integer value equal to or larger than an argument.

When the highest accuracy position encoded data file containing the absolute distance information absoluteDistance, the exponent part index exp_index_high, the object number nObj, the sign bit information associated with the highest accuracy quantized position information for each object, and the mantissa part of the highest accuracy quantized position information for each object is obtained in this manner, the process subsequently proceeds to step S16 of FIG. 7.

In step S16, the absolute coordinate position information encoder 51 transmits the generated highest accuracy position encoded data file to the server 52 by wireless or wired communication or the like. Thereafter, the encoding process ends.

Note that the server 52 transmits a storage completion notification indicating that the highest accuracy position encoded data file has been stored correctly in the server 52 as described below when this storage is correctly completed. Accordingly, the absolute coordinate position information encoder 51 receives the transmitted storage completion notification and displays this notification in an appropriate manner.

Moreover, in response to transmission of the highest accuracy position encoded data file, the server 52 starts a file storing process.

Specifically, the communication unit 101 of the server 52 in step S31 receives the highest accuracy position encoded data file transmitted from the absolute coordinate position information encoder 51, under the control by the communication control unit 111, and supplies the received highest accuracy position encoded data file to the control unit 102.

In step S32, the control unit 102 supplies the highest accuracy position encoded data file supplied from the communication unit 101 to the recording unit 61 and causes the recording unit 61 to store (record) the highest accuracy position encoded data file. In this manner, the highest accuracy position encoded data file is stored (recorded) in the recording unit 61.

Subsequently, the communication control unit 111 controls the communication unit 101 to transmit a storage completion notification indicating that the highest accuracy position encoded data file has been stored correctly to the absolute coordinate position information encoder 51. Thereafter, the file storing process ends.

In the manner described above, the absolute coordinate position information encoder 51 encodes normalized position information associated with each object with highest accuracy and transmits a highest accuracy position encoded data file containing the highest accuracy quantized position information thus obtained to the server 52. In addition, the server 52 stores the highest accuracy position encoded data file received from the absolute coordinate position information encoder 51.

As a result, the server 52 is capable of generating quantized position information with any level of quantized accuracy from highest accuracy quantized position information in response to a request from the client 54 and transmitting the generated quantized position information to the client 54.

In this manner, more reduction of a processing load on the content distribution side, such as the server 52 and the absolute coordinate position information encoder 51, is achievable along with more reduction of a transfer volume of information, by obtaining polar coordinate position information for each object on the client 54 side, than in a case where the highest accuracy quantized position information is transferred to the client 54 without any change.

<Description of Position Information Acquiring Process and Position Information Transmitting Process>

After a highest accuracy position encoded data file is stored in the server 52, the client 54 is allowed to receive, from the server 52, supply of quantized position information associated with content for each object. Described below will be a process performed by the client 54 when acquiring quantized position information from the server 52. Specifically, a position information acquiring process performed by the client 54 and a position information transmitting process performed by the server 52 will hereinafter be described with reference to a flowchart of FIG. 9.

When the client 54 starts the position information acquiring process, the communication unit 141 in step S61 transmits an object number transmission request to the server 52 via wireless or wired communication or the like, under the control by the communication control unit 151.

The object number transmission request here is information which requests transmission of object number notification information indicating the number of objects constituting content, i.e., the number of objects present within the space.

In response to transmission of the object number transmission request, the server 52 starts the position information transmitting process. Specifically, the communication unit 101 in step S81 receives the object number transmission request transmitted from the client 54, under the control by the communication control unit 111, and supplies the received request to the control unit 102.

Subsequently, the transmission information generation unit 112 generates object number notification information indicating an object number nObj with reference to a highest accuracy position encoded data file recorded in the recording unit 61. The communication control unit 111 supplies the generated object number notification information to the communication unit 101.

In step S82, the communication unit 101 transmits, to the client 54, the object number notification information supplied from the communication control unit 111, under the control by the communication control unit 111.

On the other hand, the communication unit 141 of the client 54 in step S62 receives the object number notification information transmitted from the server 52, under the control by the communication control unit 151, and supplies the received information to the control unit 142.

In this manner, the client 54 is capable of recognizing the object number nObj of the content and making preparation or the like for processes to be performed in a following stage according to the object number nObj.

Note that the object number notification information may be a frame or the like containing header information in a format (syntax) presented in FIG. 10, for example.

According to the example of FIG. 10, the header information contains absolute distance information absoluteDistance and information indicating an object number nObj expressed by a character "Num_of_Object." Note that the header information depicted in FIG. 10 may be added to all signals to be transmitted from the server 52 to the client 54, transmitted to the client 54 at an appropriate timing such as the time of initiation, or regularly transmitted to the client 54.

When the object number nObj is specified, the communication control unit 151 generates a transmission request for requesting transmission of lowest accuracy quantized position information to the server 52 and supplies the generated request to the communication unit 141.

While described here is the example where low accuracy quantized position information initially acquired by the client 54 from the server 52 is lowest accuracy quantized position information, the low accuracy quantized position information may be low accuracy quantized position information with any level of quantized accuracy as long as the quantized accuracy is lower than the highest accuracy.

In step S63, the communication unit 141 transmits, to the server 52, the transmission request supplied from the communication control unit 151 and requesting transmission of the lowest accuracy quantized position information, under the control by the communication control unit 151.

Subsequently, the communication unit 101 of the server 52 in step S83 receives the lowest accuracy quantized position information transmission request transmitted from the client 54 and supplies the received request to the control unit 102, under the control by the communication control unit 111.

In step S84, the transmission information generation unit 112 generates mantissa parts of the lowest accuracy quantized position information with reference to the highest accuracy position encoded data file recorded in the recording unit 61, in response to the transmission request supplied from the communication unit 101.

Specifically, for example, the transmission information generation unit 112 extracts mantissa parts Qpx_high(i), Qpy_high(i), and Qpz_high(i) of highest accuracy quantized position information contained in the highest accuracy position encoded data file for each object.

Moreover, the transmission information generation unit 112 shifts the mantissa parts Qpx_high(i), Qpy_high(i), and Qpz_high(i) by a difference between an exponent part index exp_index_high and a lowest accuracy exponent part index exp_index=0 with lowest quantized accuracy and designates the shifted mantissa parts as Qpx_low(i), Qpy_low(i), and Qpz_low(i) which are mantissa parts of respective coordinates of an x coordinate, a y coordinate, and a z coordinate representing a lowest accuracy absolute position.

In other words, the mantissa parts of the lowest accuracy quantized position information can be obtained by extracting information corresponding to a bit number of the lowest accuracy exponent part index exp_index from an MSB (Most Significant Bit) side (highest order bit side) of the mantissa part of the highest accuracy quantized position information.

If the value of the exponent part index exp_index_high is 9, for example, information obtained by eliminating information corresponding to low-order 9 bits of the mantissa part Qpx_high(i) by a shift process for the mantissa part Qpx_high(i) is designated as the mantissa part Qpx_low(i) of the x coordinate of the lowest accuracy absolute position.

In addition, the transmission information generation unit 112 designates sign bit information sign_x(i), sign_y(i), and sign_z(i) of highest accuracy quantized position information contained in the highest accuracy position encoded data file, as sign bit information included in the lowest accuracy quantized position information without change. No change is needed because the sign bit is identical regardless of levels of quantized accuracy.

In step S85, the transmission information generation unit 112 generates lowest accuracy quantized position information which contains the mantissa parts Qpx_low(i), Qpy_low(i), and Qpz_low(i) obtained by processing in step S84 and the sign bit information sign_x(i), sign_y(i), and sign_z (i).

In this manner, lowest accuracy quantized position information presented in FIG. 11 is obtained, for example. In more detail, FIG. 11 presents an example of syntax of a bit stream containing lowest accuracy quantized position information for each object.

According to this example, sign bit information sign_x(i), sign_y(i), and sign_z(i) of lowest accuracy quantized position information and mantissa parts Qpx_low(i), Qpy_low(i), and Qpz_low(i) of respective coordinates of lowest accuracy quantized position information are stored in a bit stream for each of the number of objects indicated by an object number nObj.

When the lowest accuracy quantized position information is obtained in this manner, the communication control unit 111 supplies the lowest accuracy quantized position information for each of the objects to the communication unit 101.

In step S86, the communication unit 101 transmits, to the client 54, the lowest accuracy quantized position information supplied from the communication control unit 111 for each of the objects, under the control by the communication control unit 111. Thereafter, the position information transmitting process ends.

FIG. 12 presents here a specific example of encoding of a coordinate of one axis included in normalized position information associated with a certain object.

In FIG. 12, a perceptive limit angle θ is set to an angle of 1.5 degrees, while a tolerance angle defined by the perceptive limit angle θ is an angle of 0.75 degrees. In addition, an absolute distance absoluteDistance has a length of 30 m, while a coordinate of normalized position information is set to 0.1.

The example of FIG. 12 presents values of binary numbers, i.e., binary values, of mantissa parts corresponding to respective levels of quantized accuracy for the coordinate value 0.1, and others.

More specifically, "exponent of ½" indicates an exponent part index exp_index. Quantized accuracy increases as the value of the exponent part index exp_index increases.

Particularly here, a value of an exponent part index exp_index_high with highest quantized accuracy is "9," while a value of an exponent part index exp_index with lowest quantized accuracy corresponding to lowest quantized accuracy is "0."

In addition, "distance between listener and object" indicates a distance between the listener U12 and the object when two positions spaced away from each other by a quantized step width with quantized accuracy corresponding to the exponent part index exp_index are located at positions spaced away from each other by the perceptive limit angle θ as viewed from the listener U12.

Indicated by "quantized step width" is a quantized step width corresponding to the exponent part index exp_index.

Represented by "real number quantized value" is a real value when the coordinate value "0.1" of normalized position information is quantized using the quantized step width corresponding to the exponent part index exp_index.

In addition, indicated by "quantized bit number" is a bit number of a mantissa part of quantized normalized position information. Indicated by "binary" is a binary value (value of binary number) of the mantissa part of the quantized normalized position information, and indicated by "integer quantized value" is a value (integer value) of the mantissa part. Accordingly, the value indicated by "integer quantized value" is the value of the mantissa part of the quantized normalized position information, and a binary value of this value is the value indicated by "binary."

Particularly here, as for the exponent part index exp_index having the value of 9, an integer value of the value indicated by "real number quantized value" is designated as an integer quantized value of the mantissa part of the quantized normalized position information.

On the other hand, as for the exponent part indexes exp_index having values of 8 to 0, each mantissa part of these indexes is obtained by extracting a part of the binary value of the mantissa part of the exponent part index exp_index having the value of 9.

For example, a value obtained by extracting high-order seven bits of the binary value of the mantissa part of the exponent part index exp_index having the value of 9 becomes the binary value of the mantissa part of the exponent part index exp_index having the value of 0.

Note that "0000" existing on the MSB side is omitted here from the part of the binary value of the mantissa part for easy understanding of the figure.

Moreover, "Position after decoding" indicates a coordinate value of normalized position information obtained by decoding on the basis of the mantissa part of the quantized normalized position information, i.e., the value indicated by "binary."

According to this example, the coordinate value of the quantized (encoded) normalized position information is "0.1." In this case, ideally, the coordinate value of the decoded normalized position information becomes "0.1." However, here, quantized accuracy decreases as the exponent part index exp_index decreases. Therefore, an error of the coordinate value after decoding also increases as quantized accuracy decreases.

At the time of encoding (quantization) of normalized position information, the quantized bit number is determined for the exponent part index exp_index, and the mantissa part of the quantized bit number, i.e., the binary value of the quantized value of the coordinate value, is obtained.

According to comparisons between the mantissa parts of the respective exponent part indexes exp_index, it is understood that the quantized bit number increases as the value of the exponent part index exp_index increases and that a value is added to the mantissa part in a direction toward the LSB (Least Significant Bit), i.e., toward the lowest-order bit.

This means that the quantized accuracy of the mantissa part increases as the exponent part index exp_index increases. In addition, if only information with high quantized accuracy, i.e., the mantissa part of the highest accuracy quantized position information, is retained, the mantissa part of the low accuracy quantized position information can be obtained only by eliminating information on the LSB side of the mantissa part without a necessity of new calculation of quantization.

The quantized step width step corresponding to the exponent part index exp_index here is expressed by the following Equation (6).

[Math. 6]

$$\text{step} = 2 \times \tan(\theta/2)/\text{sqrt}(3) \times (1/2)^{\text{exp\_index}} \quad (6)$$

In addition, the quantized bit number of the mantissa part corresponding to the exponent part index exp_index can be obtained by calculating ceil(log 2(1/step+1)) using the quantized step width step. Note that ceil( ) is a ceiling function.

Accordingly, in a case where the value of the exponent part index exp_index is "0," for example, the quantized bit number becomes 7.

Suppose here that the value of the exponent part index exp_index_high is "9," for example. In this case, a difference between the exponent part index with highest accuracy exp_index_high=9 and the exponent part index exp_index with lowest accuracy=0 becomes 9.

Accordingly, the mantissa part of the coordinate of the lowest accuracy quantized position information becomes a 7-bit value "0000110" obtained by eliminating low-order bits of the mantissa part "0000110100111011" of the coordinate of the highest accuracy quantized position information by 9 bits corresponding to the difference between the exponent part indexes.

In other words, in a case where the exponent part index exp_index with lowest accuracy is 0, the quantized bit number becomes 7. Accordingly, the mantissa part of the coordinate of the lowest accuracy quantized position information is obtained by extracting high-order 7 bits of the mantissa part of the coordinate of the highest accuracy quantized position information.

Figure 9:
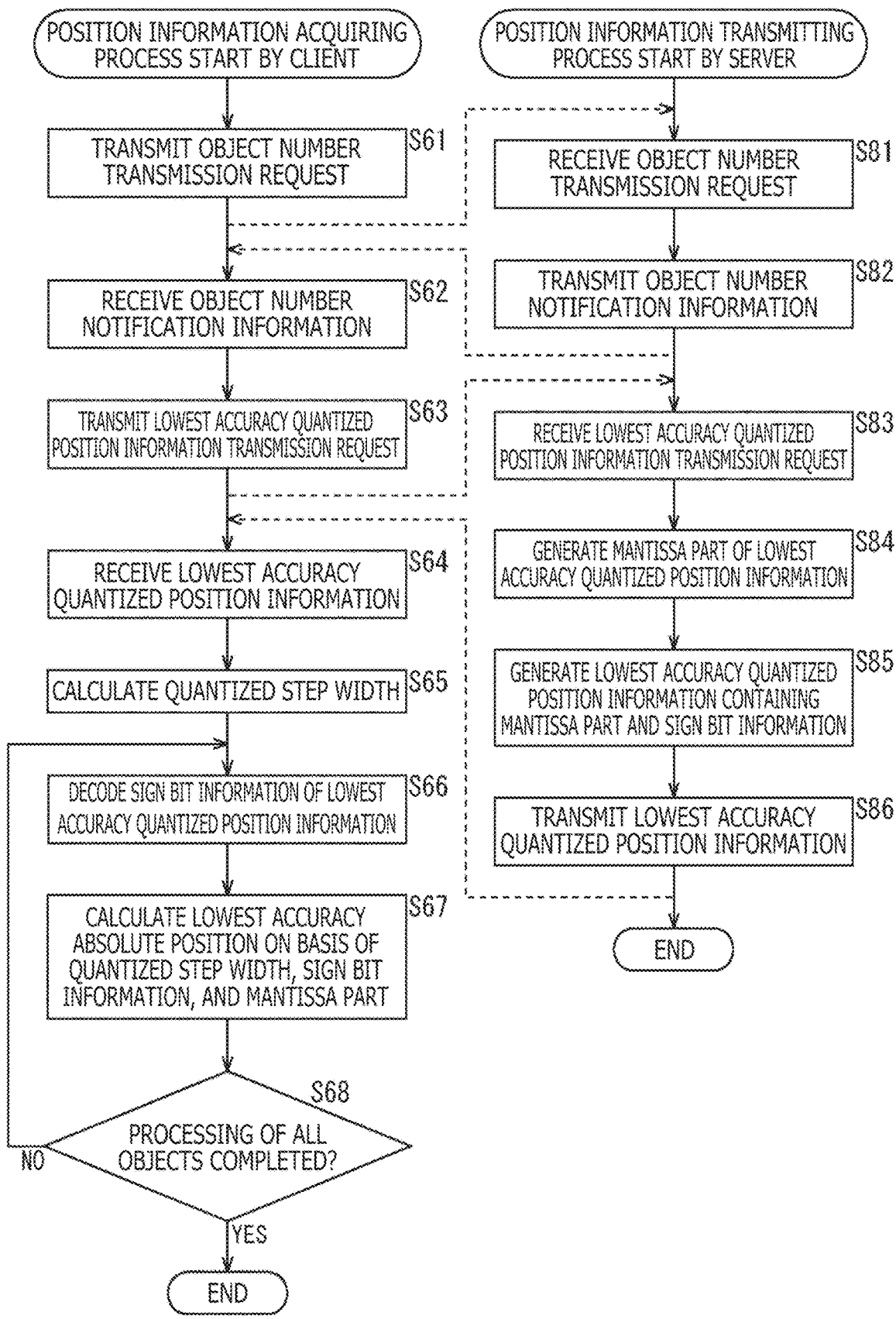
FIG. 9 is a flowchart explaining a position information acquiring process and a position information transmitting process.

Returning to the description referring to the flowchart of FIG. 9, the client 54 performs processing in step S64 when the lowest accuracy quantized position information is transmitted from the server 52.

In step S64, the communication unit 141 receives the lowest accuracy quantized position information transmitted from the server 52, under the control by the communication control unit 151, and supplies the received information to the control unit 142. The communication control unit 151 therefore acquires the lowest accuracy quantized position information.

In response to reception of the lowest accuracy quantized position information, the absolute coordinate position information decoder 71 selects the number of the respective objects indicated by the object number nObj one by one as a processing target object and calculates lowest accuracy absolute position of these objects.

More specifically, in step S65, the absolute coordinate position information decoder 71 calculates a quantized step width by performing calculation similar to the calculation of Equation (4), on the basis of the perceptive limit angle θ already known and the absolute distance information absoluteDistance contained in the header information included in the frame or the like received from the server 52. The value of exponent part index exp_index with lowest accuracy here is 0. Accordingly, the quantized step width is calculated by substituting 0 for the value of the exponent part index exp_index_sel in Equation (4).

In step S66, the absolute coordinate position information decoder 71 decodes the sign bit information sign_x(i), sign_y(i), and sign_z(i) included in the lowest accuracy quantized position information received in step S64 for the processing target object. In this manner, respective pieces of decoded sign bit information sign_x_val(i), sign_y_val(i), and sign_z_val(i) are obtained.

In step S67, the absolute coordinate position information decoder 71 calculates a lowest accuracy absolute position of the processing target object on the basis of the quantized step width obtained in step S65, the sign bit information sign_x_val(i), sign_y_val(i), and sign_z_val(i) obtained in step S66, and the mantissa parts Qpx_low(i), Qpy_low(i), and Qpz_low(i) of the lowest accuracy quantized position information received in step S64.

In other words, the absolute coordinate position information decoder 71 performs calculation similar to the calculation of Equation (5) described above to obtain decoded lowest accuracy normalized position information including x coordinate Dtx(i), y coordinate Dty(i), and z coordinate Dtz(i) indicating the decoded lowest accuracy absolute position.

Specifically, in Equation (5), the quantized step width obtained in step S65 is substituted for the quantized step width step_dec, and the mantissa parts Qpx_low(i), Qpy_low(i), and Qpz_low(i) are substituted for Qpx_sel(i), Qpy_sel(i), and Qpz_sel(i). In addition, the absolute distance information absoluteDistance received from the server 52 is used. In this manner, the x coordinate Dtx(i), the y coordinate Dty(i), and the z coordinate Dtz(i) corresponding to the x coordinate Dpx(i), the y coordinate Dpy(i), and the z coordinate Dpz(i) are obtained.

The decoded lowest accuracy normalized position information including the x coordinate Dtx(i), the y coordinate Dty(i), and the z coordinate Dtz(i) thus obtained is temporary decoded normalized position information. The processing from step S65 to step S67 described above corresponds to a process for decoding the lowest accuracy quantized position information.

In step S68, the absolute coordinate position information decoder 71 determines whether or not all of the objects have been processed as processing target objects.

In a case of determination that not all of the objects have been processed in step S68, the process returns to step S66 to repeat the processing described above. In this case, an object not processed as a processing target is selected as the next processing target object, and decoded lowest accuracy normalized position information associated with this object is obtained.

On the other hand, in a case of determination that all of the objects have been processed in step S68, the position information acquiring process ends.

In the manner described above, the client 54 receives lowest accuracy quantized position information from the server 52, performs the decoding process, and obtains decoded lowest accuracy normalized position information. In addition, the server 52 generates lowest accuracy quantized position information in response to a request from the client 54 and transmits the generated information to the client 54.

In this manner, a transfer volume of information transmitted and received between the server 52 and the client 54 can be reduced more than in a case where highest accuracy quantized position information is transmitted and received.

Note that described here has been the example where lowest accuracy quantized position information to be transferred (transmitted) to the client 54 is generated on the basis of highest accuracy quantized position information which is the only information recorded in the server 52 beforehand. However, quantized position information at respective levels of quantized accuracy may be retained in the server 52 beforehand to read out quantized position information with requested quantized accuracy and transmit the read-out information to the client 54.

<Description of Additional Bit Information Acquiring Process and Additional Bit Information Transmitting Process>

Meanwhile, when the position information acquiring process described with reference to FIG. 9 is performed, decoded lowest accuracy normalized position information is obtained for each object.

Whether or not the lowest accuracy quantized position information, i.e., the decoded lowest accuracy normalized position information, has sufficient accuracy as quantized position information indicating an absolute position of an object within a space can be specified on the basis of a distance between the listener U12 and a position indicated by the normalized position information.

The quantized position information with sufficient accuracy here refers to information indicating a state where an angle formed by a direction of a position defined by normalized position information as viewed from the listener U12 and a direction of a position defined by quantized position information as viewed from the listener U12 becomes θ/2 or smaller. In other words, the position indicated by the quantized position information as viewed from the listener U12 is located at a position within a range of the perceptive limit angle θ around a center corresponding to the position indicated by the normalized position information.

The decoded lowest accuracy normalized position information indicates a not exact but approximate position of the object within the space. Accordingly, an approximate distance between the listener U12 and the object within the space can be obtained by using the decoded lowest accuracy normalized position information.

Accordingly, the client 54 can specify whether or not lowest accuracy quantized position information has sufficient quantized accuracy and quantized position information with sufficient quantized accuracy for each object, on the basis of listener position information with high accuracy measured by GPS or the like and the decoded lowest accuracy normalized position information.

In a case where the lowest accuracy quantized position information does not have sufficient quantized accuracy, the client 54 acquires additional bit information from the server 52 to obtain decoded normalized position information with sufficient accuracy. Processes performed by the client 54 and the server 52 in such a case will be described below. Specifically, an additional bit information acquiring process performed by the client 54 and an additional bit information transmitting process performed by the server 52 will be described below with reference to a flowchart of FIG. 13.

When the client 54 starts the additional bit information acquiring process, the absolute coordinate position information decoder 71 in step S121 calculates a distance ObjectDistance between the listener U12 and the object for each of the objects.

More specifically, a Euclidean distance between the listener U12 and each object within the space is calculated as the distance ObjectDistance on the basis of the listener position information supplied from the listener position acquisition apparatus 53 and the decoded lowest accuracy normalized position information.

In step S122, the absolute coordinate position information decoder 71 compares a distance "distance" determined for the exponent part index exp_index and the distance ObjectDistance while changing the value of the exponent part index exp_index from 0 to a larger value.

More specifically, for example, the absolute coordinate position information decoder 71 calculates the following Equation (7) on the basis of the exponent part index exp_index and the absolute distance information absoluteDistance, to calculate the distance "distance" corresponding to the exponent part index exp_index.

[Math. 7]

$$\text{distance} = 2 \times qrt(3) \times \text{absoluteDistance} \times (1/2)^{exp\_index} \quad (7).$$

Thereafter, the absolute coordinate position information decoder 71 compares the obtained distance "distance" and the distance ObjectDistance and determines whether or not the distance "distance" is equal to or shorter than the distance ObjectDistance.

The absolute coordinate position information decoder 71 specifies the smallest exponent part index exp_index at which the distance "distance" becomes the distance ObjectDistance or shorter while increasing the value of the exponent part index exp_index in increments of one until the distance "distance" becomes equal to or shorter than the distance ObjectDistance.

Note that the smallest exponent part index exp_index at which the distance "distance" becomes the distance ObjectDistance or shorter is hereinafter also referred to as an exponent part index exp_index_cover.

The exponent part index exp_index_cover is an exponent part index exp_index having the smallest value in the exponent part indexes exp_index of quantized position information with sufficient accuracy described above.

When the exponent part index exp_index_cover is specified for each object, the process proceeds to step S123.

In step S123, the absolute coordinate position information decoder 71 compares the exponent part index exp_index_cover with the exponent part index exp_index of the lowest accuracy quantized position information for each object, to examine objects with insufficient quantized accuracy.

The exponent part index exp_index_cover here is an exponent part index exp_index with minimum necessary quantized accuracy. Accordingly, an object corresponding to the exponent part index exp_index indicated by the lowest accuracy quantized position information and smaller than the exponent part index exp_index_cover is considered as an object with insufficient quantized accuracy.

Particularly here, the value of the exponent part index exp_index of the lowest accuracy quantized position information is 0. Accordingly, an object corresponding to the exponent part index exp_index_cover having a value of 1 or larger is considered as an object with insufficient accuracy and requiring additional bit information.

By this examining process, an object with insufficient quantized accuracy and requiring additional bit information is specified, and necessary quantized accuracy is determined (specified) from plural levels of quantized accuracy determined beforehand for the specified object. The necessary quantized accuracy referred to here is quantized accuracy (quantized step width) corresponding to the exponent part index exp_index_cover.

In step S124, the absolute coordinate position information decoder 71 designates decoded lowest accuracy normalized position information obtained for lowest accuracy quantized position information indicating an exponent part index exp_index equal to or larger than the exponent part index exp_index_cover, as final decoded normalized position information.

In other words, decoded lowest accuracy normalized position information with sufficient quantized accuracy has been obtained for the object corresponding to the exponent part index exp_index equal to or larger than the exponent part index exp_index_cover. Accordingly, the x coordinate Dtx(i), the y coordinate Dty(i), and the z coordinate Dtz(i) of the decoded lowest accuracy normalized position information are designated as the x coordinate Dpx(i), the y coordinate Dpy(i), and the z coordinate Dpz(i) of the decoded normalized position information without any change.

In step S125, the communication unit 141 transmits a transmission request for additional bit information for the object specified as the object corresponding to the exponent part index exp_index smaller than the exponent part index exp_index_cover, i.e., the object requiring additional bit information.

For example, the absolute coordinate position information decoder 71 generates a transmission request for additional bit information containing the number of objects requiring transmission of additional bit information, an object index resend_object_index(j), and an exponent part index resend_exe_index(j).

The object index resend_object_index(j) here is an index i for identifying the object requiring transmission of the additional bit information, i.e., the object corresponding to the exponent part index exp_index smaller than the exponent part index exp_index_cover.

The exponent part index resend_exp_index(j) is an exponent part index exp_index corresponding to quantized accuracy finally required for the object indicated by the index resend_object_index(j). In this case, the value of the exponent part index exp_index_cover is used as the value of the exponent part index resend_exp_index(j) without any change.

In this manner, a transmission request in a format (syntax) presented in FIG. 14, for example, is obtained.

According to this example, information indicating the number of objects requiring transmission of additional bit information and expressed by a character "num_of_resend_objects" is disposed at the head of the transmission request.

Moreover, the number of the object indexes resend_object_index(j) and the exponent part indexes resend_exp_index(j) indicated by num_of_resend_objects are disposed after the information indicating the number of objects.

Figure 13:
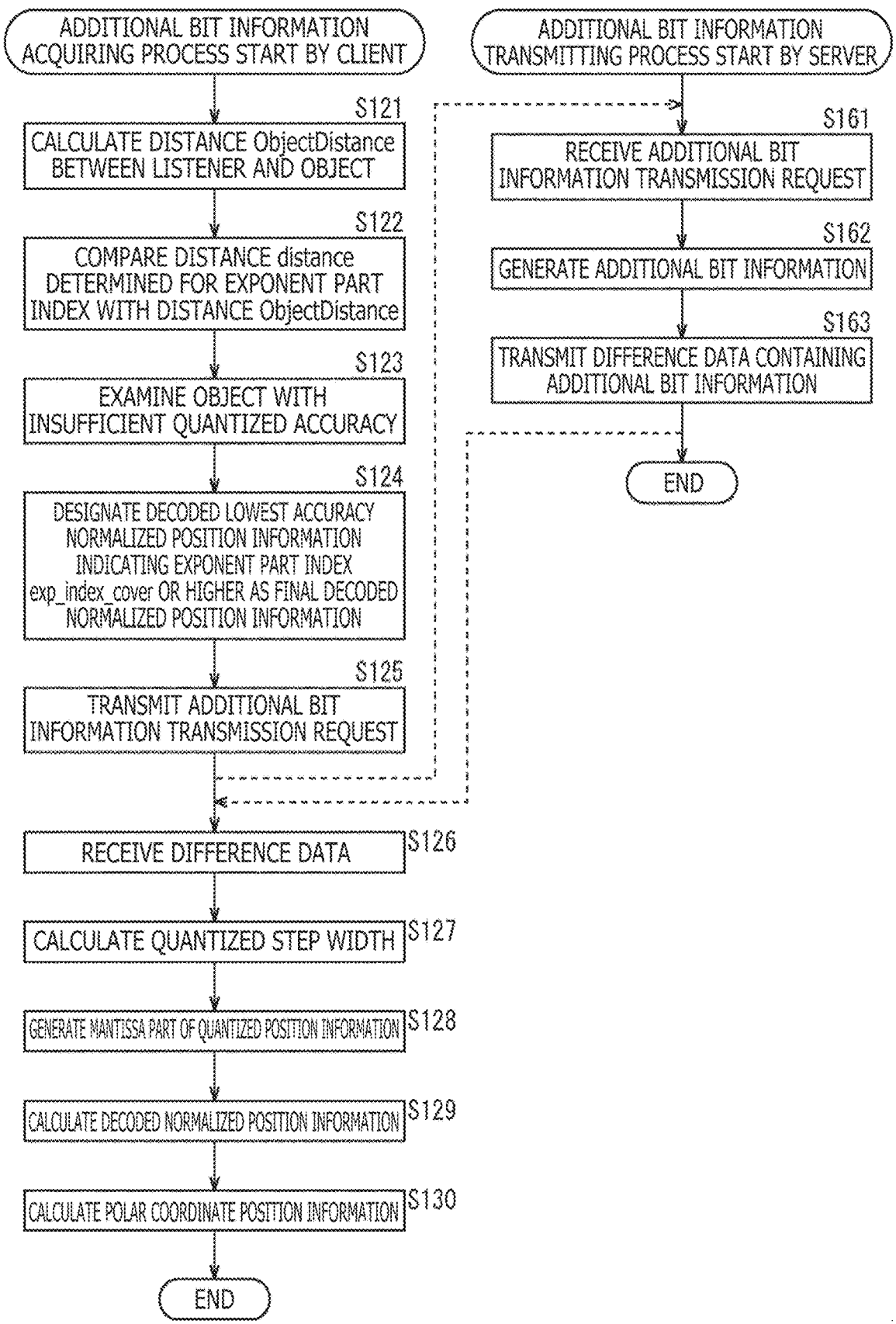
FIG. 13 is a flowchart explaining an additional bit information acquiring process and an additional bit information transmitting process.

Returning to the description of FIG. 13, the communication control unit 151 supplies the transmission request generated in such manner for requesting transmission of additional bit information to the communication unit 141 and causes the communication unit 141 to transmit the transmission request to the server 52.

In response to transmission of the transmission request for additional bit information, the server 52 starts an additional bit information transmitting process.

Specifically, the communication unit 101 in step S161 receives the transmission request for additional bit information transmitted from the client 54, under the control by the communication control unit 111, and supplies the received request to the control unit 102.

In step S162, the transmission information generation unit 112 generates additional bit information associated with the object for which transmission of the additional bit information is requested, in response to the transmission request supplied from the communication unit 101, i.e., in response to a request from the client 54 corresponding to a transmission destination of lowest accuracy quantized position information.

Specifically, for example, the transmission information generation unit 112 extracts mantissa parts Qpx_high(i), Qpy_high(i), and Qpz_high(i) of highest accuracy quantized position information contained in the highest accuracy position encoded data file, for the object indicated by the index resend_object_index(j).

Moreover, the transmission information generation unit 112 shifts the mantissa parts Qpx_high(i), Qpy_high(i), and Qpz_high(i) by a difference between the exponent part index exp_index_high and the exponent part index resend_exp_index(j).

In this manner, bits corresponding to the difference between the exponent part index exp_index_high on the low-order bit side of each of the mantissa parts Qpx_high(i), Qpy_high(i), and Qpz_high(i) and the exponent part index resend_exp_index(j) are eliminated to obtain the mantissa parts of the quantized position information associated with the exponent part index resend_exp_index(j).

The transmission information generation unit 112 eliminates the bits corresponding to the bit number of the mantissa parts of the lowest accuracy quantized position information on the high-order bit side from the obtained mantissa parts of the quantized position information indicating the exponent part index resend_exp_index(j) and designates the remaining parts as additional bit information.

The additional bit information includes additional bit information Qpx_diff(j), Qpy_diff(j), and Qpz_diff(j) corresponding to difference information between the mantissa parts of the respective coordinates of the x coordinate, the y coordinate, and the z coordinate of the quantized position information indicating the exponent part index resend_exp_index(j) and the corresponding mantissa parts of the lowest accuracy quantized position information.

For example, the additional bit information Qpx_diff(j) is a difference between the mantissa part of the x coordinate of the quantized position information indicating the exponent part index resend_exp_index(j) and the mantissa part Qpx_low(i) of the x coordinate of the lowest accuracy quantized position information.

Suppose that the value of the exponent part index resend_exp_index(j) is 7 in the example presented in FIG. 12, for example.

In this case, the exponent part index exp_index_high of highest accuracy quantized position information is 9. Accordingly, a difference between this value of 9 and the exponent part index resend_exp_index(j)=7 becomes 2.

In addition, by eliminating the low-order 2 bits from the mantissa part "0000110100111011" of the highest accuracy quantized position information, a mantissa part "00001101001110" of the low accuracy quantized position information indicating the exponent part index resend_exp_index(j)=7 is obtained.

In addition, the bit number of the mantissa part of the lowest accuracy quantized position information is 7. Accordingly, additional bit information "1001110" is obtained by eliminating the high-order 7 bits from the mantissa part "00001101001110." The client 54 side adds the additional bit information "1001110" thus obtained to the low-order bit side of mantissa part "0000110" of the lowest accuracy quantized position information. In this manner, a mantissa part "00001101001110" of the low accuracy quantized position information indicating the exponent index resend_exp_index(j)=7 finally required is obtained.

When the additional bit information is obtained by the above processing for the object indicated by each of the indexes resend_object_index(j), the transmission information generation unit 112 generates difference data containing the respective pieces of additional bit information.

In this manner, difference data in a format (syntax) presented in FIG. 15 is obtained, for example. According to this example, the difference data contains the number of additional bit information Qpx_diff(j), Qpy_diff(j), and Qpz_diff(j) indicated by num_of_resend_objects described above.

Note that the bit number of each piece of the additional bit information in FIG. 15 is the bit number corresponding to the number of resend_exp_index(j).

Returning to the description of FIG. 13, the communication control unit 111 supplies the difference data containing the additional bit information to the communication unit 101 to control transmission to the client 54.

In step S163, the communication unit 101 transmits, to the client 54, the difference data containing the additional bit information and supplied from the communication control unit 111, under the control by the communication control unit 111. Thereafter, the additional bit information transmitting process ends.

Moreover, in response to transmission of the difference data, the client 54 performs processing of step S126.

In step S126, the communication unit 141 receives the difference data transmitted from the server 52, under the control by the communication control unit 151, and supplies the difference data to the control unit 142. Accordingly, the communication control unit 151 acquires the difference data containing the additional bit information.

In step S127, the absolute coordinate position information decoder 71 calculates Equation (4) using the value of the exponent part index resend_exp_index(j) as an exponent part index exp_index_sel, for each of the objects indicated by the indexes resend_object_index(j), to calculate a quantized step width step_dec.

In step S127, the quantized step width step_dec is calculated for each object determined to have insufficient quantized accuracy in step S123, i.e., each of the objects indicated by indexes resend_object_index(j).

In step S128, the absolute coordinate position information decoder 71 generates a mantissa part of quantized position information indicating the exponent part index resend_exp_index(j) on the basis of the difference data supplied from the communication unit 141, for each of the objects indicated by the indexes resend_object_index(j).

Specifically, the absolute coordinate position information decoder 71 adds additional bit information Qpx_diff(j), Qpy_diff(j), and Qpz_diff(j) contained in the difference data to the low-order bit side of the mantissa parts Qpx_low(i), Qpy_low(i), and Qpz_low(i) of the lowest accuracy quantized position information.

In this manner, the mantissa parts of the respective coordinates of the quantized position information indicating the exponent part index resend_exp_index(j) are obtained and designated as mantissa parts Qpx_sel(i), Qpy_sel(i), and Qpz_sel(i) finally decided.

In step S129, the absolute coordinate position information decoder 71 calculates decoded normalized position information associated with each object indicated by the respective indexes resend_object_index(j).

More specifically, Equation (5) is calculated on the basis of the quantized step width step_dec obtained in step S127, the absolute distance information absoluteDistance, the sign bit information subjected to decoding obtained in step S66 of FIG. 9, and the mantissa parts obtained in step S128 and finally decided, to calculate decoded normalized position information.

The processing from step S127 to step S129 described above is a process for decoding the quantized position information obtained from the lowest accuracy quantized position information and the additional bit information. Moreover, the decoded normalized position information is obtained by the above processing for all of the objects indicated by the object number nObj.

In step S130, the coordinate transformation unit 72 calculates polar coordinate position information indicating the position of the object as viewed from the listener U12 within the space, on the basis of the decoded normalized position information and the listener position information supplied from the listener position acquisition apparatus 53, for each of the objects.

Thereafter, the coordinate transformation unit 72 supplies the obtained polar coordinate position information to the output unit 143. The output unit 143 outputs the respective pieces of polar coordinate position information to the MPEG-H renderer 55. When the output unit 143 completes output of the polar coordinate position information for all of the objects to the MPEG-H renderer 55, the additional bit information acquiring process ends.

After the end of the additional bit information acquiring process, the MPEG-H renderer 55 performs rendering. Specifically, the MPEG-H renderer 55 performs rendering on the basis of audio data for each of the objects acquired from the server 52 or the like and the polar coordinate position information supplied from the output unit 143, generates reproduction audio data where audio images of the objects are localized at respective positions within the space, and outputs the generated reproduction audio data to the reproduction system such as a speaker.

In the manner described above, the client 54 acquires (receives) additional bit information from the server 52 and calculates decoded normalized position information with sufficient accuracy for objects with insufficient quantized accuracy. Moreover, the server 52 generates additional bit information in response to a request from the client 54 and transmits the generated additional bit information to the client 54.

In this manner, the client 54 is capable of obtaining decoded normalized position information with sufficient accuracy by an information transfer volume smaller than that volume in a case where highest accuracy quantized position information is acquired from the server 52 at the beginning.

Moreover, the process for obtaining necessary quantized accuracy and the process for calculating polar coordinate position information are all performed by the client 54. Accordingly, reduction of the processing load is achievable on the content distribution side such as the server 52 and the absolute coordinate position information encoder 51. Particularly, this processing load reduction effect increases as the number of the clients 54 connected to the server 52 increases.

Note that the polar coordinate position information on the client 54 side changes at the time of reproduction of content every time any of the positions of the objects and the listener U12 within the space changes.

Accordingly, the client 54 updates the polar coordinate position information when the listener position information associated with the listener U12 changes, for example.

However, in a case where the listener U12 moves in a direction away from the object which is stationary within the space, update of decoded normalized position information is not particularly required for this object. This update is not required because a necessary level of accuracy further decreases in a state where the distance between the object and the listener U12 increases, in addition to the stationary state of the object. In other words, the update is not required because decoded normalized position information with sufficient accuracy has already been provided.

In such a case, for example, the communication control unit 151 of the client 54 causes the server 52 to transmit a transmission request by controlling the communication unit 141 to request transmission of lowest accuracy quantized position information containing indexes i of only an object having moved and an object located at a shorter distance than before from the listener U12. Thereafter, the communication unit 141 receives, from the server 52, only the lowest accuracy quantized position information associated with the objects corresponding to the indexes i in step S64 of FIG. 9. The client 54 performs subsequent processing to update the polar coordinate position information.

In addition, necessary quantized accuracy for the object stationary and located at a shorter distance than before from the listener U12 can be specified on the basis of the decoded normalized position information obtained in the foregoing processing and new listener position information associated with the listener U12.

Accordingly, in this case, decoded normalized position information with sufficient accuracy can be obtained without the necessity of acquiring new lowest accuracy quantized position information, by performing the additional bit information acquiring process in FIG. 13 on the client 54 side, for the object which is stationary and located at a shorter distance than before from the listener U12.

As described above, according to the present technology, information indicating a position of an object can be transferred while a one-sided processing load on a content distribution side is avoided in free-viewpoint 3D audio. Moreover, appropriate quantized accuracy is specified according to a distance between the listener U12 and an object and the human perceptive limit angle θ. Accordingly, transfer of quantized position information producing a difference from an original audio image direction not exceeding a perceptive limit is achievable along with reduction of a transfer volume.

<Configuration Example of Computer>

Meanwhile, a series of processes described above may be executed either by hardware or by software. In a case where the series of processes is executed by software, a program constituting the software is installed in a computer. Examples of the computer here include a computer incorporated in dedicated hardware and a computer capable of executing various functions under various programs installed in the computer, such as a general-purpose personal computer.

FIG. 16 is a block diagram depicting a configuration example of hardware of a computer executing the series of processes described above under the program.

In the computer, a CPU (Central Processing Unit) 501, a ROM (Read Only Memory) 502, and a RAM (Random Access Memory) 503 are connected to each other via a bus 504.

An input/output interface 505 is further connected to the bus 504. An input unit 506, an output unit 507, a recording unit 508, a communication unit 509, and a drive 510 are connected to the input/output interface 505.

The input unit 506 includes a keyboard, a mouse, a microphone, an imaging element, and the like. The output unit 507 includes a display, a speaker, and the like. The recording unit 508 includes a hard disk, a non-volatile memory, and the like. The communication unit 509 includes a network interface and the like. The drive 510 drives a removable recording medium 511 such as a magnetic disk, an optical disk, a magneto-optical disk, and a semiconductor memory.

According to the computer configured as above, the CPU 501 loads the program recorded in the recording unit 508 into the RAM 503 via the input/output interface 505 and the bus 504 and executes the loaded program to perform the series of processes described above, for example.

The program to be executed by the computer (CPU 501) is allowed to be recorded in the removable recording medium 511, such as a package medium, and provided in this form. Alternatively, the program is allowed to be provided via a wired or wireless transfer medium, such as a local area network, the Internet, and digital satellite broadcasting.

According to the computer, the program is allowed to be installed in the recording unit 508 via the input/output interface 505 from the removable recording medium 511 attached to the drive 510. Alternatively, the program is allowed to be received by the communication unit 509 via a wired or wireless transfer medium and installed in the recording unit 508. Instead, the program is allowed to be installed in the ROM 502 or the recording unit 508 beforehand.

Note that the program to be executed by the computer may be a program where processes are performed in time series in an order described in the present description or may be a program where processes are performed in parallel or at a necessary timing such as at an occasion of a call.

Further, embodiments of the present technology are not limited to the embodiment described above and may be modified in various manners without departing from the scope of the subject matters of the present technology.

For example, the present technology is allowed to have a configuration of cloud computing where one function is shared and processed by plural apparatuses in cooperation with each other via a network.

Moreover, the respective steps described in the above flowcharts are allowed to be executed by one apparatus or shared and executed by plural apparatuses.

Furthermore, in a case where one step contains plural processes, the plural processes contained in the one step are allowed to be executed by one apparatus or shared and executed by plural apparatuses.

In addition, the present technology may also have the following configurations.

(1)

An information processing apparatus including:
an acquisition unit that acquires low accuracy position information having first accuracy and indicating a position of an object within a space where a user is located and acquires additional information for obtaining position information that has second accuracy higher than the first accuracy, indicates the position of the object within the space, and corresponds to a position of the user; and
a position information calculation unit that obtains the position information on the basis of the low accuracy position information and the additional information.

(2)

The information processing apparatus according to (1), in which
the position information calculation unit specifies the object that requires the additional information, on the basis of user position information indicating the position of the user and the low accuracy position information, and the acquisition unit acquires the additional information associated with the object included in one or a plurality of the objects and specified by the position information calculation unit.

(3)

The information processing apparatus according to (2), in which
the position information calculation unit determines the second accuracy of the position information from plural levels of accuracy on the basis of the user position information and the low accuracy position information, for each of the objects requiring the additional information.

(4)

The information processing apparatus according to (2) or (3), in which
each of the low accuracy position information and the position information includes information that indicates an absolute coordinate of the position of the object within the space, and
the user position information includes information that indicates an absolute coordinate of the position of the user within the space.

(5)

The information processing apparatus according to (4), further including:
a transformation unit that transforms the position information into polar coordinate information that indicates a relative position of the object as viewed from the user, on the basis of the position information and the user position information.

(6)

The information processing apparatus according to any one of (1) to (5), in which
the additional information includes information that indicates a difference between the position information and the low accuracy position information.

(7)

The information processing apparatus according to any one of (1) to (6), in which
the object includes an audio object.

(8)

An information processing method performed by an information processing apparatus, including:
acquiring low accuracy position information that has first accuracy and indicates a position of an object within a space where a user is located;
acquiring additional information for obtaining position information that has second accuracy higher than the first accuracy, indicates the position of the object within the space, and corresponds to a position of the user; and
obtaining the position information on the basis of the low accuracy position information and the additional information.

(9)

A program under which a computer executes a process including steps of:
acquiring low accuracy position information that has first accuracy and indicates a position of an object within a space where a user is located;
acquiring additional information for obtaining position information that has second accuracy higher than the first accuracy, indicates the position of the object within the space, and corresponds to a position of the user; and
obtaining the position information on the basis of the low accuracy position information and the additional information.

(10)

An information processing apparatus including:
a communication unit that transmits low accuracy position information having first accuracy and indicating a position of an object within a space where a user is located, and transmits additional information for obtaining position information having second accuracy higher than the first accuracy, indicating the position of the object within the space, and corresponding to a position of the user, in response to a request from a transmission destination of the low accuracy position information.

(11)

The information processing apparatus according to (10), in which
each of the low accuracy position information and the position information includes information that indicates an absolute coordinate of the position of the object within the space.

(12)

The information processing apparatus according to (10) or (11), in which
the additional information includes information that indicates a difference between the position information and the low accuracy position information.

(13)

The information processing apparatus according to (12), further including:
a recording unit that records highest accuracy position information obtained by quantizing information indicating the position of the object with a quantized step width having highest accuracy; and
a transmission information generation unit that generates the low accuracy position information or the additional information by extracting a part of the highest accuracy position information.

(14)

The information processing apparatus according to (13), in which
the quantized step width is set to a value obtained by multiplying a value of ½ raised to the power of an exponent by a constant.

(15)

The information processing apparatus according to any one of (10) to (14), in which
the object includes an audio object.

(16)

An information processing method performed by an information processing apparatus, including:
transmitting low accuracy position information that has first accuracy and indicates a position of an object within a space where a user is located; and
transmitting additional information for obtaining position information that has second accuracy higher than the first accuracy, indicates the position of the object within the space, and corresponds to a position of the user, in response to a request from a transmission destination of the low accuracy position information.

(17)

A program under which a computer executes a process including steps of:
transmitting low accuracy position information that has first accuracy and indicates a position of an object within a space where a user is located; and
transmitting additional information for obtaining position information that has second accuracy higher than the first accuracy, indicates the position of the object within the space, and corresponds to a position of the user, in response to a request from a transmission destination of the low accuracy position information.

REFERENCE SIGNS LIST

52 Server, 54 Client, 61 Recording unit, 71 Absolute coordinate position information decoder, 72 Coordinate transformation unit, 101 Communication unit, 102 Control unit, 141 Communication unit, 142 Control unit

The invention claimed is:

1. An information processing apparatus for rendering one or more audio objects comprising:
 a user position unit determining information for a position of a user and transmitting the user position information;
 an acquisition unit coupled to the user position unit that acquires low accuracy position information for at least one of the audio objects having a first accuracy and indicating a position of the at least one audio object within a space relative to the user position information and acquires additional information for obtaining position information for the at least one audio object relative to the user position information that has a second accuracy higher than the first accuracy;
 a position information calculation unit coupled to the acquisition unit that obtains the position information of the at least one audio object relative to the user position information on a basis of the low accuracy position information and the additional information; and
 a renderer coupled to the position information calculation unit receiving data relating to the at least one audio object including the position information, generating reproduction audio data for the at least one audio object localized to the position information of the at least one audio object, and outputting the generated reproduction audio data to a speaker.

2. The information processing apparatus according to claim 1, wherein
 the position information calculation unit specifies the at least one object that requires the additional information, on a basis of the user position information indicating the position of the user and the low accuracy position information, and
 the acquisition unit acquires the additional information associated with the at least one object included in the one or more audio objects and specified by the position information calculation unit.

3. The information processing apparatus according to claim 2, wherein
 the position information calculation unit determines the second accuracy of the position information for the at least one audio object from a plurality of levels of accuracy on a basis of the user position information and the low accuracy position information, for each of the one or more audio objects requiring the additional information.

4. The information processing apparatus according to claim 2, wherein
 each of the low accuracy position information and the position information for the at least one audio object includes information that indicates an absolute coordinate of the position of the object for the at least one audio object within the space, and
 the user position information includes information that indicates an absolute coordinate of the position of the user within the space.

5. The information processing apparatus according to claim 4, further comprising:
 a transformation unit coupled to the position information calculation unit that transforms the position information for the at least one audio object into polar coordinate information that indicates a relative position of the at least one audio object as viewed from the user, on a basis of the position information for the at least one audio object and the user position information.

6. The information processing apparatus according to claim 1, wherein
 the additional information includes information that indicates a difference between the position information for the at least one audio object and the low accuracy position information.

7. An information processing method for rendering one or more audio objects performed by an information processing apparatus, comprising:
 determining information for a position of a user and transmitting the user position information;
 acquiring low accuracy position information for at least one of the audio objects that has a first accuracy and indicates a position of the at least one audio object within a space relative to the user position information;
 acquiring additional information for obtaining position information for the at least one audio object relative to the user position information that has a second accuracy higher than the first accuracy;
 obtaining the position information on a basis of the low accuracy position information and the additional information and;
 rendering the at least one audio object by generating reproduction audio data for the at least one audio object localized to the position information of the at least one audio object, and outputting the generated reproduction audio data to a speaker.

8. A program for rendering one or more audio objects stored on a non-transitory computer readable medium that when executed performs a process comprising steps of:
 determining information for a position of a user and transmitting the user position information;
 acquiring low accuracy position information for at least one of the audio objects that has a first accuracy and indicates a position of the at least one audio object within a space relative to the user position information;
 acquiring additional information for obtaining position information for the at least one audio object relative to the user position information that has a second accuracy higher than the first accuracy;
 obtaining the position information of the at least one audio object relative to the user position information on a basis of the low accuracy position information and the additional information; and
 rendering the at least one audio object by generating reproduction audio data for the at least one audio object localized to the position information of the at least one audio object, and outputting the generated reproduction audio data to a speaker.

* * * * *